(12) United States Patent
Apotovsky et al.

(10) Patent No.: US 9,641,535 B2
(45) Date of Patent: *May 2, 2017

(54) APPARATUS AND DATA PROCESSING SYSTEMS FOR ACCESSING AN OBJECT

(71) Applicant: Servmax, Inc., San Diego, CA (US)

(72) Inventors: Boris Apotovsky, Encinitas, CA (US); Oleksii Koliadin, Carlsbad, CA (US)

(73) Assignee: Servmax, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,328

(22) Filed: Mar. 22, 2016

(65) Prior Publication Data
US 2016/0202917 A1    Jul. 14, 2016

Related U.S. Application Data

(63) Continuation of application No. 14/103,182, filed on Dec. 11, 2013, now Pat. No. 9,325,711.

(60) Provisional application No. 61/735,697, filed on Dec. 11, 2012, provisional application No. 61/786,846, filed on Mar. 15, 2013.

(51) Int. Cl.
| H04L 29/06 | (2006.01) |
| G06F 3/06 | (2006.01) |
| G06F 12/10 | (2016.01) |
| G06F 12/14 | (2006.01) |

(52) U.S. Cl.
CPC .............. H04L 63/10 (2013.01); G06F 3/067 (2013.01); G06F 3/0622 (2013.01); G06F 3/0631 (2013.01); G06F 3/0637 (2013.01); G06F 12/10 (2013.01); G06F 12/1458 (2013.01); H04L 63/0823 (2013.01); G06F 2212/1052 (2013.01); G06F 2212/154 (2013.01); G06F 2212/263 (2013.01); G06F 2212/65 (2013.01); G06F 2221/2141 (2013.01)

(58) Field of Classification Search
CPC ...... H04L 63/10; H04L 63/0823; G06F 12/10
USPC .......................................................... 726/6
See application file for complete search history.

(56) References Cited

U.S. PATENT DOCUMENTS

| 3,026,475 A | 2/2000 | Woodman |
| 6,037,938 A | 3/2000 | Wolge |

(Continued)

OTHER PUBLICATIONS

Office Action in U.S. Appl. No. 14/103,182 mailed Jan. 2, 2015.
Office Action in U.S. Appl. No. 14/103,182 mailed Sep. 2, 2015.

*Primary Examiner* — Hadi Armouche
*Assistant Examiner* — Angela Holmes
(74) *Attorney, Agent, or Firm* — Greenberg Traurig, LLP; Roman Fayerberg; Andrew F. Abramson

(57) ABSTRACT

A system and method for providing access to an object over a network may comprise hosting an object on a distributed data processing system accessible over the network, the object contained within a cell; generating, by a cell access provider, a unique and random address for the cell containing the object, utilizing an address resolution module and providing, by the cell access provider, the unique and random address to a computing device of a unique consumer; and upon receipt of the unique and random address from the unique user, matching the unique and random address with the cell to facilitate access by the unique user to the object. The object may comprise a virtual object acting as a cell for facilitating access to one or more additional objects. The virtual object cell may contain one or more unique and random addresses facilitating access to one or more additional objects.

26 Claims, 23 Drawing Sheets

(56) References Cited

U.S. PATENT DOCUMENTS

| | | |
|---|---|---|
| 6,101,498 A | 8/2000 | Tarbox et al. |
| 6,115,817 A | 9/2000 | Whitmire |
| 6,141,738 A | 10/2000 | Munter |
| 6,480,900 B1 | 11/2002 | Habert |
| 6,742,163 B1 | 5/2004 | Ono et al. |
| 6,769,018 B2 | 7/2004 | Gagnon |
| 7,209,921 B2 | 4/2007 | Pace et al. |
| 7,340,438 B2 | 3/2008 | Nordman et al. |
| 7,343,422 B2 | 3/2008 | Garcia-Luna-Aceves et al. |
| 7,383,282 B2 | 6/2008 | Whitehead et al. |
| 7,500,002 B2 | 3/2009 | Karger et al. |
| 7,552,233 B2 | 6/2009 | Raju et al. |
| 7,565,450 B2 | 7/2009 | Garcia-Luna-Aceves et al. |
| 7,577,754 B2 | 8/2009 | Garcia-Luna-Aceves et al. |
| 7,603,439 B2 | 10/2009 | Dilley et al. |
| 7,631,078 B2 | 12/2009 | Ackaouy et al. |
| 7,640,253 B2 | 12/2009 | Theimer et al. |
| 7,647,404 B2 | 1/2010 | Cooper et al. |
| 7,953,888 B2 | 5/2011 | Ricciulli |
| 7,966,398 B2 | 6/2011 | Wiles |
| 7,971,133 B2 | 6/2011 | Fujita et al. |
| 8,015,298 B2 | 9/2011 | Yevmenkin et al. |
| 3,046,495 A1 | 10/2011 | Cooper et al. |
| 8,185,604 B2 | 5/2012 | Forrester |
| 9,325,711 B2 | 4/2016 | Apotovsky et al. |
| 2003/0200437 A1 | 10/2003 | Oishi |
| 2009/0319683 A1 | 12/2009 | Martin |
| 2013/0107889 A1 | 5/2013 | Barabash |
| 2014/0173706 A1 | 6/2014 | Apotovsky et al. |

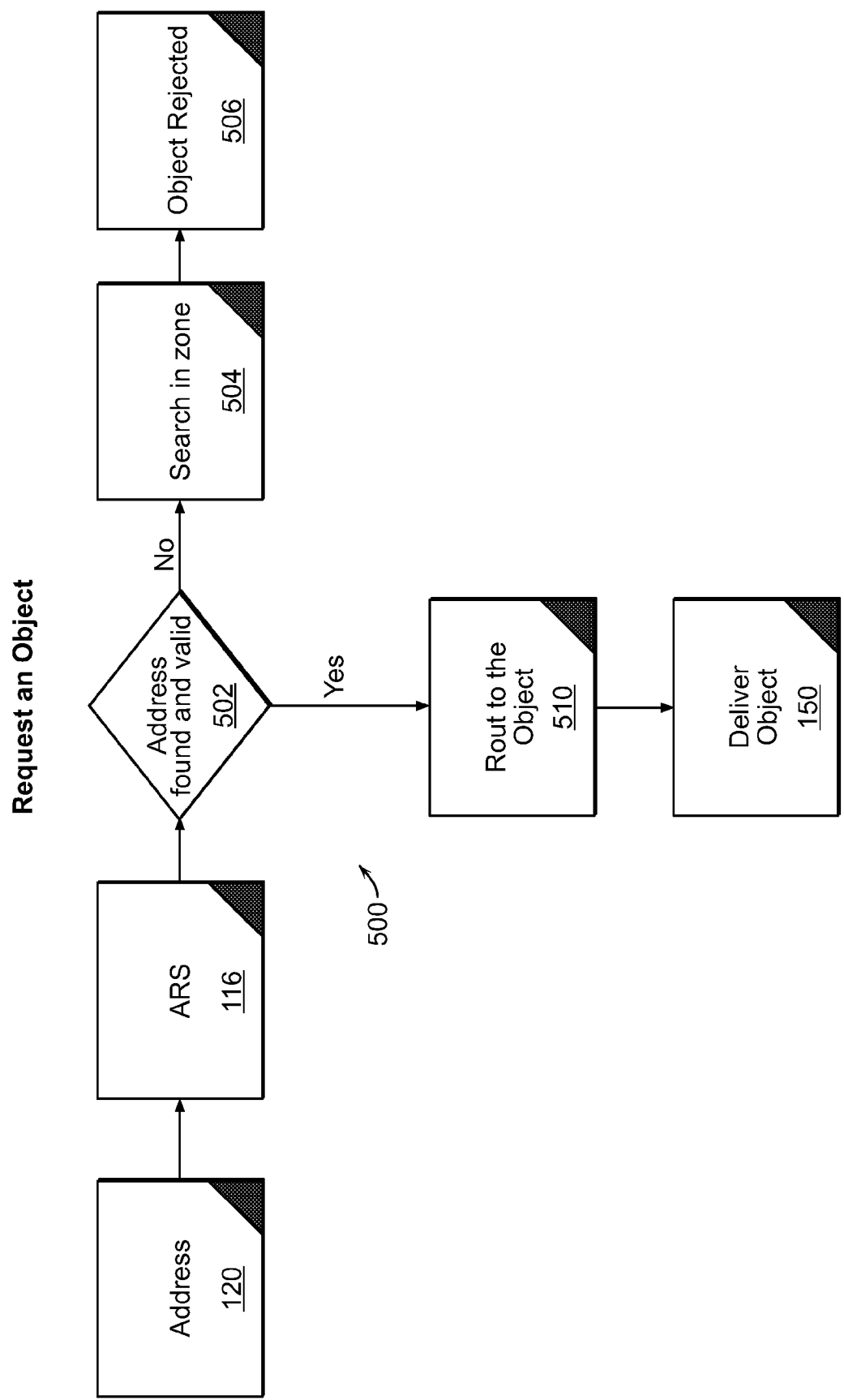

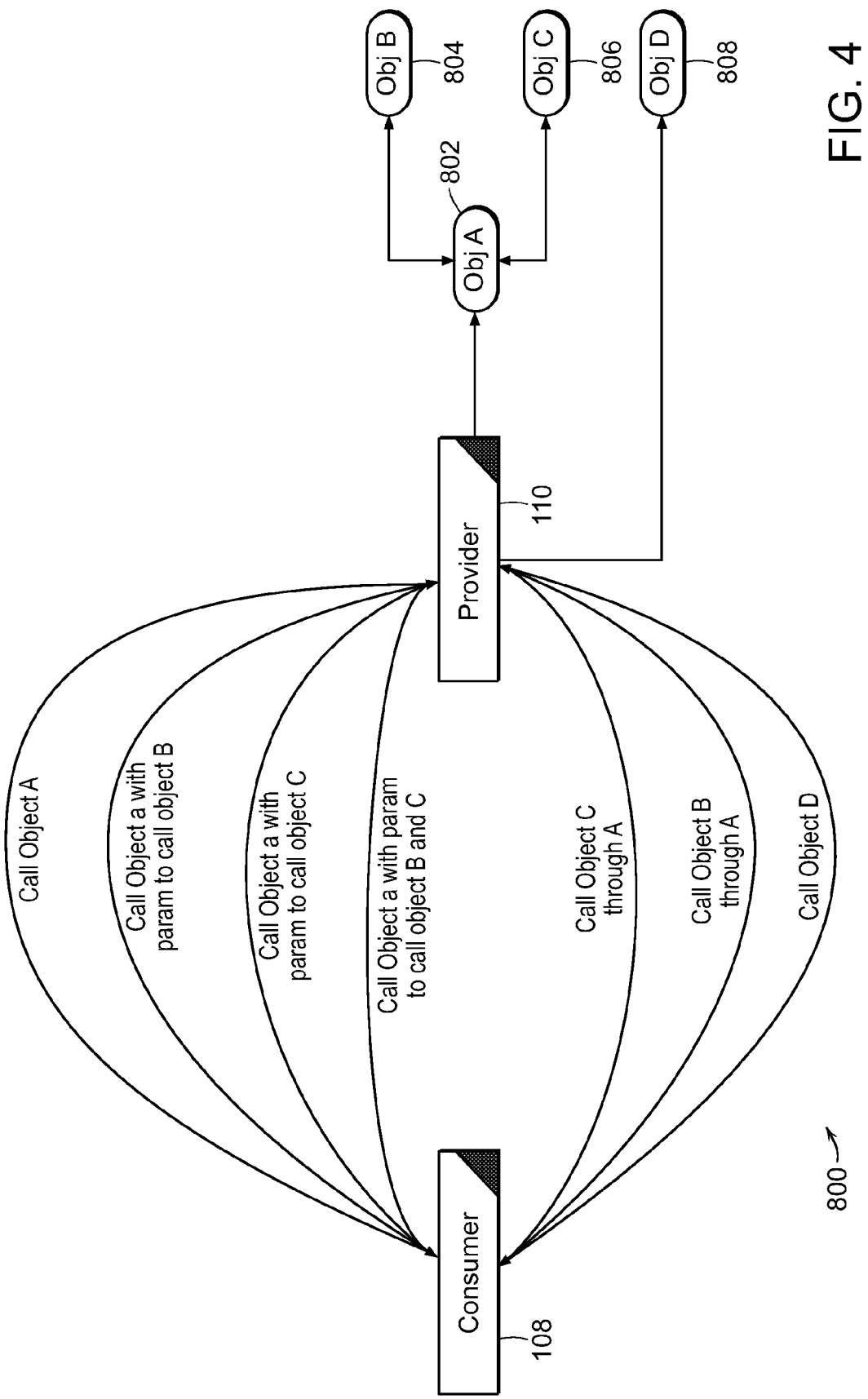

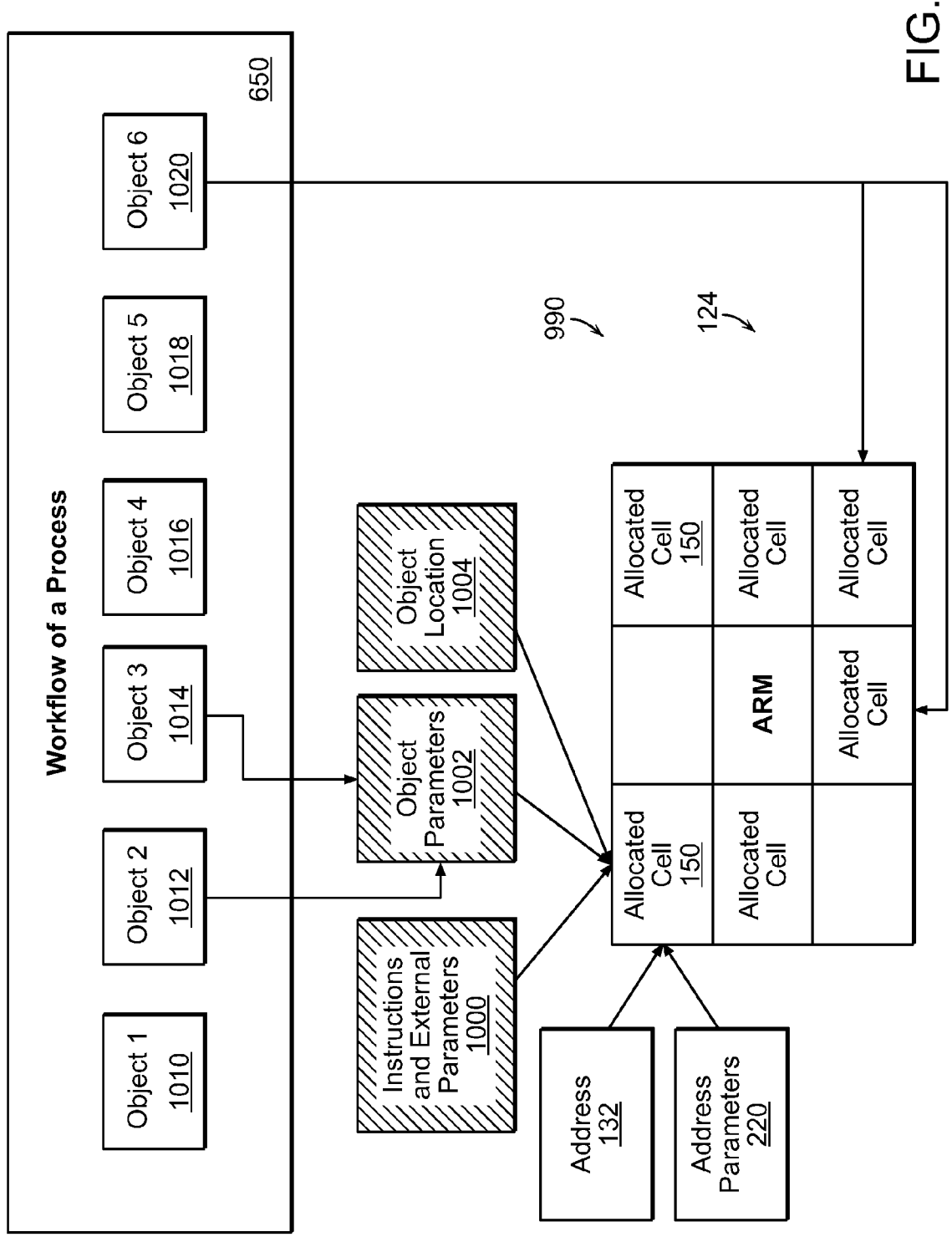

APPARATUS AND DATA PROCESSING SYSTEMS FOR ACCESSING AN OBJECT

RELATED CASES

The present application is a continuation patent application of U.S. patent application Ser. No. 14/103,182, entitled APPARATUS AND DATA PROCESSING SYSTEMS FOR ACCESSING AN OBJECT, filed on Dec. 11, 2013, which claims priority to U.S. Provisional Patent Application, Ser. No. 61/786,846, entitled APPARATUS AND DATA PROCESSING SYSTEMS FOR ACCESSING AN OBJECT, filed on Mar. 15, 2013, and U.S. Provisional Patent Application, Ser. No. 61/735,697, entitled APPARATUS AND DATA PROCESSING SYSTEMS FOR ACCESSING AN OBJECT, filed on Dec. 11, 2012, the entire contents of which are incorporated herein by reference for all purposes and as if the entire applications including claims, if any, and Figures were repeated verbatim in the present application.

FIELD

The embodiments disclosed herein relate to systems and apparatus for allocating, controlling, managing and providing access to an object over a network.

BACKGROUND

There is currently a need for a method of providing access to an object over a network, such as to allow participants in a work flow to access documents, information, etc. for that purpose, with anonymity from others participating in the work flow, and/or without access to all aspects and/or participants in the work flow. Use of authentication, e.g., user name(s) and password(s) or other forms of authenticating ID can be cumbersome to manage and are subject to being corrupted by fraudulent users. The presently disclosed subject matter addresses these needs.

SUMMARY

The instant disclosure provides apparatus, distributed data processing systems and methods for random unique secure access to non uniform objects.

In some embodiments, systems of the present disclosure include a network of distributed data processing systems for hosting an object, consumer endpoint devices for connecting to the network to create and access the object, apparatus with an address generator module for assigning a unique address, i.e., existing as the only one, to the object, and one or more address resolution modules for matching the address with the object to provide access to a requested object to a user.

In some embodiments, systems of the present disclosure include a network of distributed data processing systems for hosting an object, consumer endpoint devices for connecting to the network to create and access the object, apparatus with an address generator module for assigning a unique random address to the cell where virtual object resides, and one or more address resolution modules for matching the address with a cell with object to provide access to a requested object to a user.

According to aspects disclosed herein, an object in a network may be securely accessed without a need to login into the network of distributed data processing system. There is thus no need to allocate, provide, and control access if $3^{rd}$ party is allowed to grant access to the object or its $3^{rd}$ party or share access within its own entity. Access may however be monitored, renewed, revoked automatically. Access scope may also be limited to the object scope (with special credential if required). No integration is required if one entity is required to provide access to an object (collect data, show report) to another entity. No integration/synchronization/replication of consumer access lists is required to provide access across the entity to the object. Thus no need to employ support teams, help desks and developers.

In some embodiments, system of the present disclosure includes an object abstraction layer, network for hosting objects, endpoint consumers, address generator for assigning a globally unique, random, secure address in address space to the object, address resolution module with the goal to match the address with the object and provide access to a requested object to a user/consumer.

To isolate and provide parts of the workflow as a single virtual object to one isolated consumer and to utilize objects by the consumer in the uniform and unique way independent from the provider, object parameters and requirements the system provides an abstraction layer that includes a virtual object that allows breaking dependency between actual object, location, distribution, parameters, requirements and its utilization by the consumer. Furthermore it allows representing part of the workflow as a single object thus making workflow transparent to the consumer. Each virtual object does not require its existence on a physical layer, so its allocation, utilization, termination can be fully uniform for all parties.

The address, address space and ARM allow utilizing each virtual object associated with an address by all consumers or a specific one like a completely new entity without exposing any inner representation of the object. As a result, each object associated with each address can be isolated and separated and each consumer can have its own set of object(s) independent from other consumers, and, thus, be isolated and separated. It will also be understood, however, that, while each unique user/consumer may be enabled to access the same single object or multiple objects, however broadly user/consumer is defined, as noted above, the disclosed system and method provides for such assess to any given single object or set of objects by delivering the necessary access enabling information, e.g., the unique address, to the unique user/consumer separately. As such, other unauthorized users/consumers cannot obtain the benefit of the access enabling information provided to the unique and specific user/consumer, without being included within some entity defined as the authorized unique and specific user/consumer or, e.g., until after an included authorized unique and specific user/consumer entity obtains access to the object(s). It will further be understood that a unique and specific user/consumer may be a defined group, e.g., having access to a defined point of entry to the Internet, or other network, or, e.g., to a defined network of points of entry, etc. No other unauthorized entity(ies), who is not given the necessary accessing information (not being a unique authorized user/consumer entity, or a part of such unique authorized entity as defined) can obtain such access, e.g., by self-generating or otherwise obtaining the unique accessing information. A "unique user/consumer" will be understood to have this meaning in the present application.

Access may however be monitored, renewed, revoked automatically. Access scope may also be limited to the object scope (with special credential if required). No integration is required if one entity is required to provide access to an object (e.g., to collect data, show a report) to another entity. No integration/synchronization/replication of, e.g., a user access list(s) is required to provide access across the entity to the object. Thus avoided may be any need to employ support teams, help desks and developers.

According to aspects of the disclosed subject matter, an object in a network may be securely accessed without a need for a login into the network or to provide any credentials unless specifically required. The method and system disclosed can also, e.g., allow asynchronous and parallel processing.

It will be understood that a system and method are disclosed for providing access to an object over a network which may comprise hosting an object on a distributed data processing system accessible over the network, the object contained within a cell; generating, by a cell access provider, a unique address for the cell containing the object, utilizing an address resolution module and providing, by the cell access provider, the unique address to a computing device of a unique consumer; and upon receipt of the unique address from the unique user, matching the unique address with the cell to facilitate access by the unique user to the object. The system and method may further comprise the object comprising a virtual object acting as a cell for facilitating access to one or more additional objects. The virtual object cell may contain one or more unique addresses, each matched in a respective address resolution module with a respective cell for facilitating access to one or more additional objects. The object may comprising at least one of a dynamic object, a form, a file and a set of instructions, the set of instructions defining at least one of a service, a procedure and a function. The cell may be stored in a storage device in a storage space location identified by a randomly generated address defined independently of the physical location in the storage space of the storage device. The cell may associated access parameters, which may be provided to the unique user by the cell access provider. The dynamic object may comprise an object having at least one of a property and a method not identified until runtime. The object may comprise a non-uniform object which at least one of modifies itself or is modified during runtime according to at least one of a variable, a parameter and a function. The object may comprise an input information gathering mechanism forming at least a part of a work-flow process.

Also disclosed is a tangible machine readable medium storing instructions which, when executed by a computing device, cause the computing device to perform a method, which method may comprise: hosting an object on a distributed data processing system accessible over a network, the object contained within a cell; generating, as a cell access provider, a unique address for the cell containing the object, within an address resolution module and providing, as the cell access provider, the unique address to a computing device of a unique consumer; and upon receipt of the unique address from the unique user, matching the unique address with the cell to facilitate access by the unique user to the object.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIG. 3A illustrates an embodiment of a method for sharing access to an object hosted on a network.

FIG. 4 illustrates an embodiment of a system hosting objects.

FIG. 11 illustrates a non-limiting example of a structure of an ARM together with the workflow process.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure provides apparatus and data processing systems for, e.g., accessing an object by a consumer, an individual or a system.

Figure 1A:
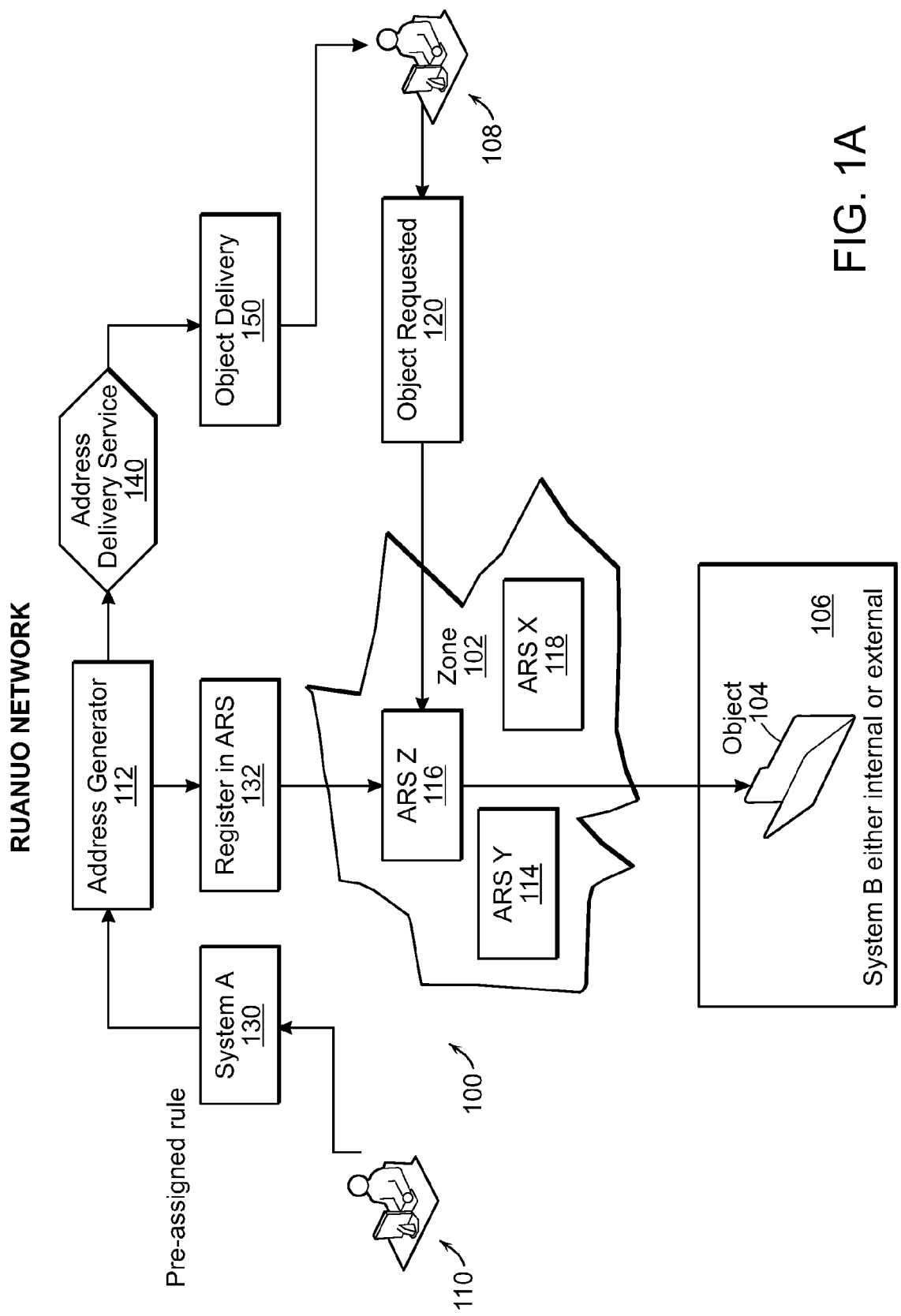
FIG. 1A illustrates an embodiment of a system for sharing access to an object hosted on a network.

In reference to FIG. 1A (Request and Delivery Network), a system 100 of the present disclosure for controlling and sharing access to an object 104 may include, e.g., a network 102 that hosts an object 104, e.g., within a cell 106, e.g., in a host device, accessible over the network. In essence, in embodiments, the network 102 can include any communication method by which information may travel between computing devices. The network 102 may include various hardware, software systems, network protocols, or combinations thereof. The network 102 can typically be the Internet, a local area network (LAN), a wide area network (WAN) or other types of networks, including but not limited to, a Bluetooth® network, a USB network, direct connections, such as through a universal serial bus (USB) port, other forms of computer-readable media, or any combination thereof. The network 102 may be a single network or may be comprised of multiple interconnected networks, such as the Internet, having the same or different architecture or protocols.

An object 104, which, e.g., may be part of a workflow (as illustrated in the examples of FIGS. 6-9) and may be a variable, function, or data structure and may include, without limitation, one or more of the following: triggers, algorithms, action, forms, files, systems, and streaming content. The object 104 can have access parameters, such as, for example, actions, user level, filters, and combinations thereof. The object 104 can be and/or can include a dynamic object, file, form, method, service, procedure, function, with/without parameters. The term "dynamic object" as used herein refers to an object having properties and methods that, e.g., are unidentified during runtime. The workflow object 104 might be non-uniform. A non-uniform object 104, as an example, can be an object 104 of any type that can morph/change depending on a variable, parameter, function, etc or can be a superposition of objects. The combination of different parts of workflow (objects, parameters etc. . . . ) can be used to create a virtual object, that can be, e.g., a logically combined set of object/s, which can be processed and represented as a single entity. Such set, e.g., a cell 106 can be distributed across multiple entities. Virtual objects can have a number of addresses with different access credentials, limitations, parameters. For example different consumers 108 might need different parts of the virtual object, so different addresses could be assigned.

An internal object 104 location can be made invisible to the consumer 108 such that it cannot be guessed or reverse engineered even if the same object 104 is shared again. A location 106 can also be made invisible because it can be hidden behind an address resolution module/system 114. The address itself does not need to have any information about object 114 or cell 106 location. Reverse proxy and deep packet inspection can be installed between an object location 106 and a consumer 108, as shown in the FIGS. and discussed herein, e.g., to completely hide/obfuscate even the scope of the object. Deep Packet Inspection (DPI) (also called complete packet inspection and Information eXtraction—IX—) is a form of computer network packet filtering that examines the data part (and possibly also the header) of a packet as it passes an inspection point, searching for protocol non-compliance, viruses, spam, intrusions, or defined criteria, e.g., to decide whether the packet may pass or if it needs to be routed to a different destination, or, for the purpose of collecting statistical information.

There are multiple headers for IP packets and network equipment only needs to use the first of these (the IP header) for normal operation, but use of the second header (TCP, UDP etc.) is normally considered to be shallow packet inspection (usually called Stateful Packet Inspection) despite this definition. Reverse proxies can hide the existence and characteristics of the origin server(s). Application firewall features can protect against common web-based attacks. Without a reverse proxy, removing malware or initiating takedowns, for example, can become difficult. In the case of secure websites, secure socket layer ("SSL") encryption, the predecessor to current transport layer security ("TLS") encryption protocols for providing communication security over a network, e.g., the Internet, may sometimes not be performed by the web server itself, but is instead offloaded to a reverse proxy that may be equipped with SSL/TLS acceleration hardware.

A reverse proxy can distribute the load from incoming requests to several servers, with each server serving its own application area. In the case of using a reverse proxy in the neighborhood of web servers, the reverse proxy may have to rewrite the URL in each incoming request in order to match the relevant internal location of the requested resource. A reverse proxy can reduce load on its origin server(s) by caching static content, as well as dynamic content. Proxy caches of this sort can often satisfy a considerable amount of website requests, greatly reducing the load on the origin server(s). Another term for this is a web accelerator. A reverse proxy can optimize content by compressing it in order to speed up loading times. In a technique known as "spoon feeding", a dynamically generated page can be produced all at once and served to the reverse-proxy, which can then return it to the client a little bit at a time. The program that generates the page is not forced to remain open, e.g., tying up server resources during the possibly extended time the client requires in order to complete the transfer. Reverse proxies can be used whenever multiple web servers must be accessible via a single public IP address. The web servers listen on different ports in the same machine, with the same local IP address or, possibly, on different machines and different local IP addresses altogether. The reverse proxy can be utilized to analyze each incoming call and delivers it to the right server within the local area network. Reverse proxies can be used to perform A/B testing and Multivariate testing without placing java script tags or code into pages.

In some embodiments, load balancing and high availability schemas can be applied. Ability to apply load balancing and high availability schemas allows the system to make sure that an address(es) is accessible even if load to an address(es) resolution module ("ARM") is high or one of ARMs is unresponsive. In some embodiments, the address resolution module may be assigned a function of matching an address(es) with a cell(s) and a cell(s) with an object(s) location and parameters, e.g., including parameters to work with an address (allowed number of activations, time frame, life time frame, availability of data, etc. . . . ). A uniform object access schema can be used in the entity even if the object is located at, e.g., a $3^{rd}$ party service provider during the limited time frame. For example, in a case when an object is located on the 3rd party share point site or 3rd party, the site can be accessed as a part of the system object. For example inspection can have pictures located on the internal network and external locations like, e.g., a drop box (behind a password), etc., and all of them can be viewed as if they are located internally. Since each transaction, activation is recordable and auditable, another example is related to the case when each object can be placed in the sandbox.

Object 104 may be hosted on a host device 106, including, but not limited to, a desktop computer, a laptop computer, server computer, tablet computer, personal electronic device, mobile electronic device, such as for example, a smart phone, personal digital assistant or similar handheld device, or any other device 106 capable of hosting the object 104.

The system 100 may also include one or more endpoint devices 108, 110 which may be utilized by consumers to connect to the host device 106 via the network 102 to create, access, and use the object 104. It will of course be understood that, in some embodiments, the host device 106 itself may be used to create, access, and use the object 104. Endpoint devices 108, 110 may typically be a network-enabled computer, tablet, or wireless handheld device, such as a PDA or smart phone, which can run an application.

The system 100 can further include an address generator module 112 for creating and assigning a unique address to each object 104. The address, which may, e.g., have one or more of the following characteristics: random, secure, global, and unique, and can be generated, does not require special processing, is easy to use, and is easy to validate. End point device 108 may be a user/consumer device and may serve to allow the user/consumer through the user/consumer device 108 to request an object through connection to, e.g., an object request module 120. The object request module 120 may communicate to an address registration system ("ARS") 114, address registration system ("ARS") 116 or address registration system (ARS) 118 from within a zone of address registration systems accessible over a network, e.g., the Internet 102.

The system 100 may also include a provider device 110 allowing a provider of an object to place the object into the system 100, e.g., related to a work flow system 130, which is in contact with an object address generator 112. Once the address is created by the address generator 112, it can be registers by the system 100 in an ARS by an address registration module 132, which is in contact with one or more ARSs 114, 116 and/or 118, which may direct the request for storage of the object 104 on the object host 106. The object host 106 and the object 104 itself may be made accessible by the user device 108 by providing the address to the user device through an address delivery service 140, or alternatively may retrieve the object 104 from the address at the host 106 through an object delivery module 150. As is shown in the corresponding block diagram of FIG. 14, the object can comprise or give access to data 160 and/or decision information 180. In addition, the host 106 may request an address for an object from the provider device 110, e.g., executing a predefined process.

Figure 1B:
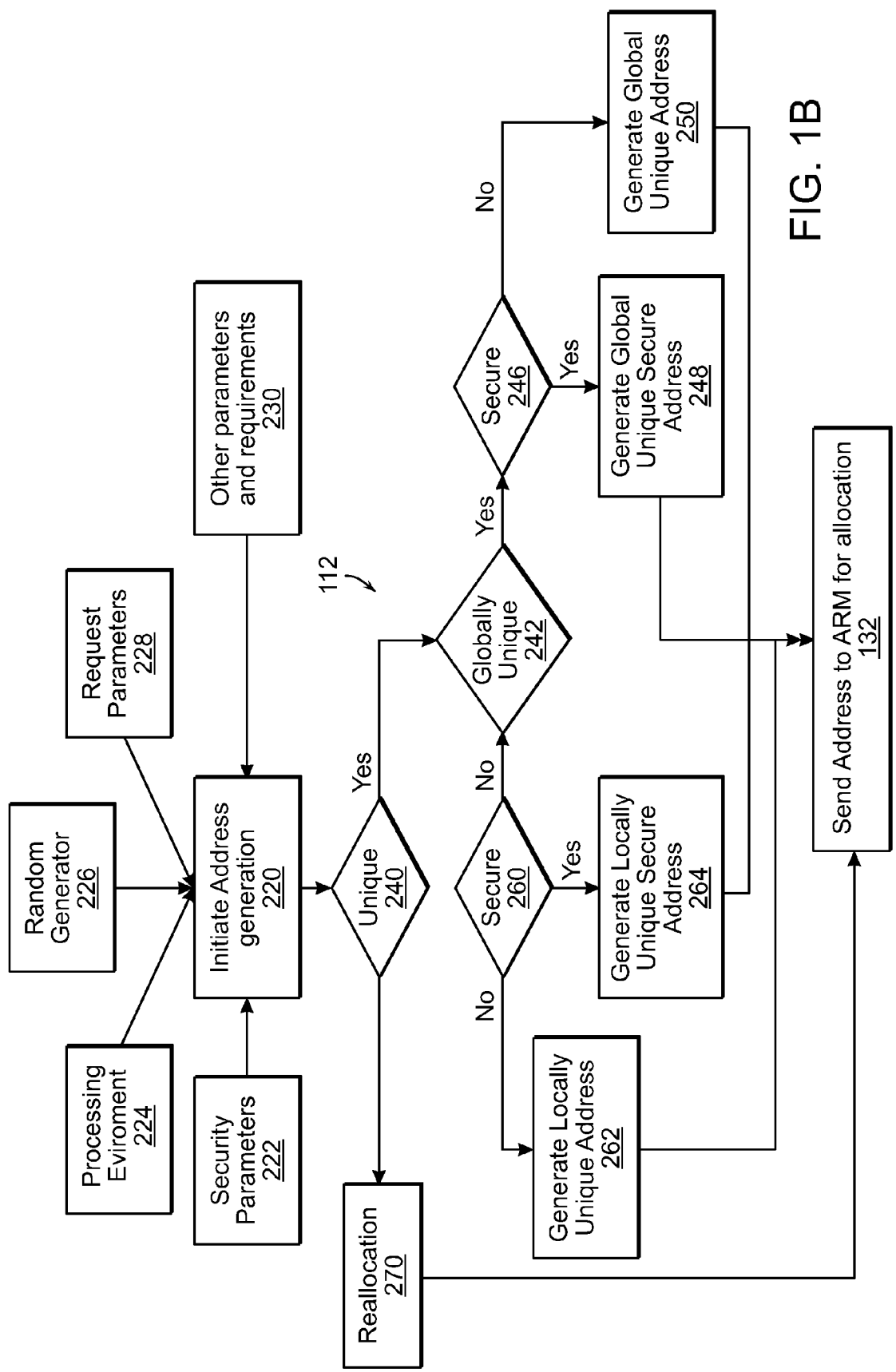
FIG. 1B is a flow chart of an embodiment of a process for generation of an address.
Figure 1C:
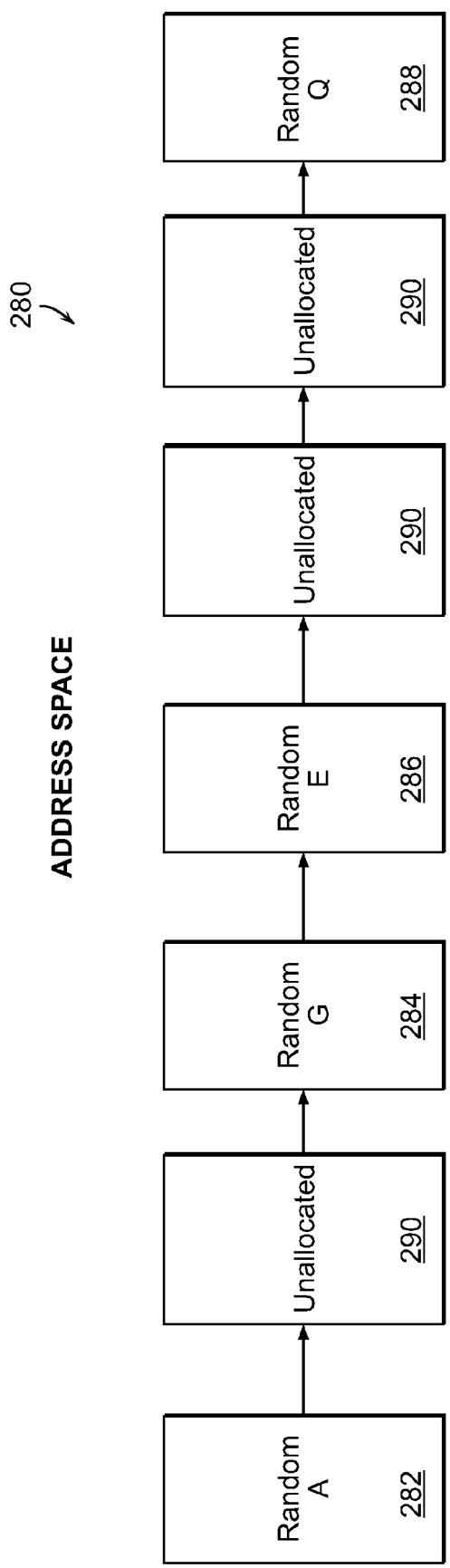
FIG. 1C illustrates an embodiment of an address space.

FIG. 1B illustrates an embodiment of method or process 112 for generating a random, secure, uniform and unique address. To the extent desired, the address may also be non-secure or non-globally unique. The address may be selected from an address space 280 (FIG. 1C). As used herein, the term "address space" may mean a range of discrete addresses, each of which may correspond to a cell in an ARM (124, 126, 128 in FIG. 1D) and a mapping mechanism. The address generation module system and method 112 may start with an initiate address generation module 220, which may receive inputs including, e.g., security parameters 222, processing environment 224, random a identifier generator 226, request parameters 228 and other parameters/requirements 230.

The output of the address generator 220 may be tested for uniqueness, e.g., local uniqueness in a uniqueness test block 240, and if found locally unique in the local uniqueness testing block 240, tested for global uniqueness in a global uniqueness testing block 242. If found globally unique, the output of the address generator 220 may be tested for security in a secure testing block 246. If found secure in secure testing block 246, the address may be output as a globally unique secure address in block 248 and, if not secure, outputted as a globally unique, but non-secure address in block 259. If found not to be globally unique in block 242, the address can be sent to a security testing block 260. If found to be secure the system can generate a locally unique secure address in block 264, and if found not to be secure, the system can generate a locally unique, but non-secure, address in block 262. The addresses may then be sent to an ARM (124, 126, 128 in FIG. 1D) in a send address to ARM block 132. If the address is found not to be locally unique in block 240, the address can be reallocated back to an ARM through a reallocation block 270.

Figure 1D:
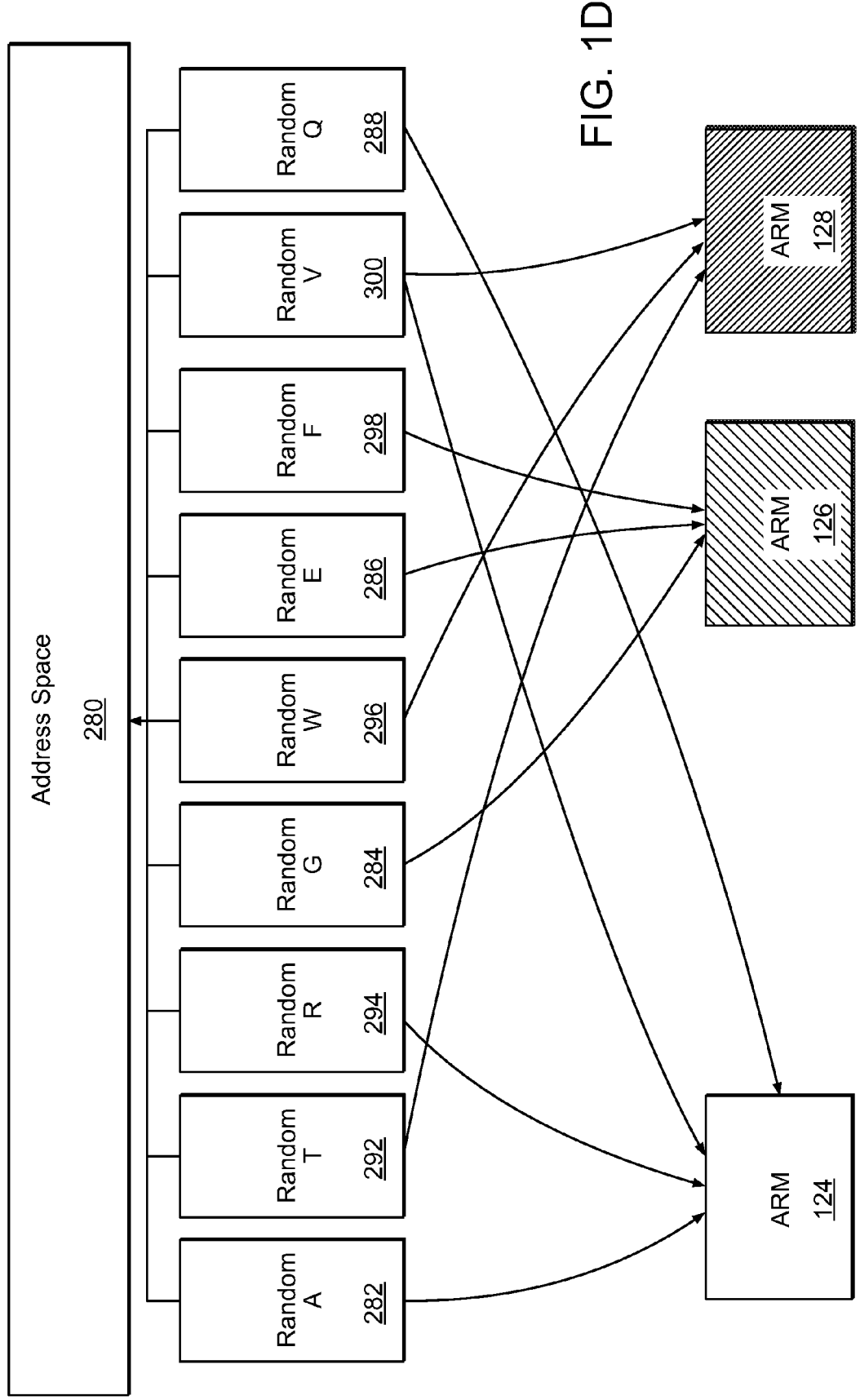
FIG. 1D illustrates a random allocation of addresses to different address resolution modules.

FIG. 1C illustrates a non-limiting example of the address space 280. The address space 280 may have one or more of the following characteristics: single dimensional (in FIG. 1C, the connection between addresses represents one dimension), random, easy to use, easy to validate as a member of the address space. The address space 280 need not have any special organization, can be enlarged, can have forbidden parts, can be reduced, can be cut, can be large or even essentially infinite and can require no embedded relationships. The address space 280 can also be such as to, e.g., render it essentially impossible to build a list of generated addresses and impossible to build a list of allocated addresses, while at the same time being easy to map. The address space 280 may be made up of a number of random memory address spaces, Random A memory space, 282, random G space, 284, random E space, 286, random Q space, 288. The address space 280 may also have a number of unallocated memory spaces, such as, unallocated spaces 290. As seen in FIG. 1D, the memory space 280 may also include an additional number of random spaces, e.g., random T space, 292, random R space, 294, random W space, 296, random F space 298, and random V space, 300.

In some embodiments, there may be no way to check all the address space 280 for address allocation and there may be no complete list of zones 102 and allocated addresses (such a list may be essentially impossible to create). Because each of the ARMs (e.g., 124, 126, 128 in FIG. 1D), e.g., is separate from one another, and each address is assigned to an ARM, e.g., 124, 126, 128, it is very difficult to create a list when the number of addresses is large enough. Because it is difficult to check all of the address space 280, undesired consumers may be, e.g., prevented from guessing an address in order to accessing any given object. Each address can have as many addresses as needed, and each address can be unique, random and secure. An address assigned to each object may be a unique or pseudo unique random set of alphanumeric characters, e.g., having an automatically-selected length. An address by itself may not contain any information regarding an object in order to provide enhanced security. In some embodiments, an address can be assigned to the object, valid for some future time, because during address allocation such an object may not yet exist or this may be a requirement, e.g., according to the a work flow process being implemented or assisted. Such allocation for a future time may be useful, e.g., because the object can be virtual or dynamic or can be created at a later point in time according to workflow.

In some embodiments, each address may have a number of restrictions, e.g., to ensure security of the object 104 to be located by using the address. For example, the address may be assigned a time frame during which it can be successfully activated and a number of activations, thus, e.g., preventing data leaks and increasing security and reliability. An address need not point directly to the system or document where the object is located. In some embodiments, to provide user information about the address, it can be supplied with a certificate or manifest. Because the address does not contain information about the object and sometimes it is required to provide information about object and sign it, supplying such information with a certificate or manifest may further enhance the security of the system.

An address can point to another address or a group of addresses (superposition, e.g., where each address in the group can have its own limitation and parameters). Address reallocation can be forbidden or allowed depending on requirements and the ARM setup. In some embodiments, parts of the address are not distributed. An address can, e.g., be organized as set of addresses. For example 11123.34.456.45678, with each set having a certain meaning to the ARM. An ARM can store address related parameters such as processing instructions. The system 100 address space 280 may further include address resolution modules (ARMs), 124, 126, 128. As an example ARM 124 can store a defined relation between an address and the actual object location. FIG. 1D illustrated a non-limiting example of a random process for allocation of addresses to ARMs. As an example, as illustrated in FIG. 1D, the random spaces 282, 284, 286, 288, 292, 294, 296, 298, 300 may each be randomly mapped to one or more respective ARMs 124, 126 and 128, such as is indicated by the arrows in FIG. 1D, where, e.g., the random memory spaces A, 282, R, 294, V, 300 and Q, 288 are mapped to ARM 124, the random memory spaces G, 284, E, 286, and F, 298 are mapped to ARM 126, and the random memory spaces T, 292, W, 296 and V, 298 are mapped to ARM 128, with, as shown, random memory space v, 300 being mapped to two ARMs, 124 and 128, respectively.

Because the address by itself does not contain any information related to the object found at the address, an ARM 124, 126 128, can act to match the address with the object so the object can be retrieved and presented to the consumer, e.g., at consumer device 108. An ARM 124, 126 128 can have a unique structure of essentially any suitable kind. None of the actual system data outside of the object scope need actually be provided to the address consumer during an address access. An address can be relocated and/or replicated to the other different ARM or, if allowed, to more than one other different ARM, which may be useful because it may allow providing access to users when they may not have access to a particular ARM but have access to one or more of the other ARMs.

In some embodiments, ARMs, e.g., 124, 126 128, may be configured to organize anonymous yet unique reporting or data collection. This feature, for example, may allow the system to, e.g., collect data about safety or environmental hazards anonymously without exposing the user/person seeking the information to others, e.g., to an administrator or an administration. This can allow inspectors/sensors/detectors to report data over an unsecure network without exposing to which place they are reporting. In some embodiments, to use this feature, an ARM's, e.g., 124's, 126's or 128's security recording may be OFF and a proxy ON. In particular, Link [e.g., on public site to generate and deliver a form]->Deliver form with anonymous link to submit it->can be utilized to submit such a form (where, e.g., all communication(s) go through the proxy).

Figure 1E:
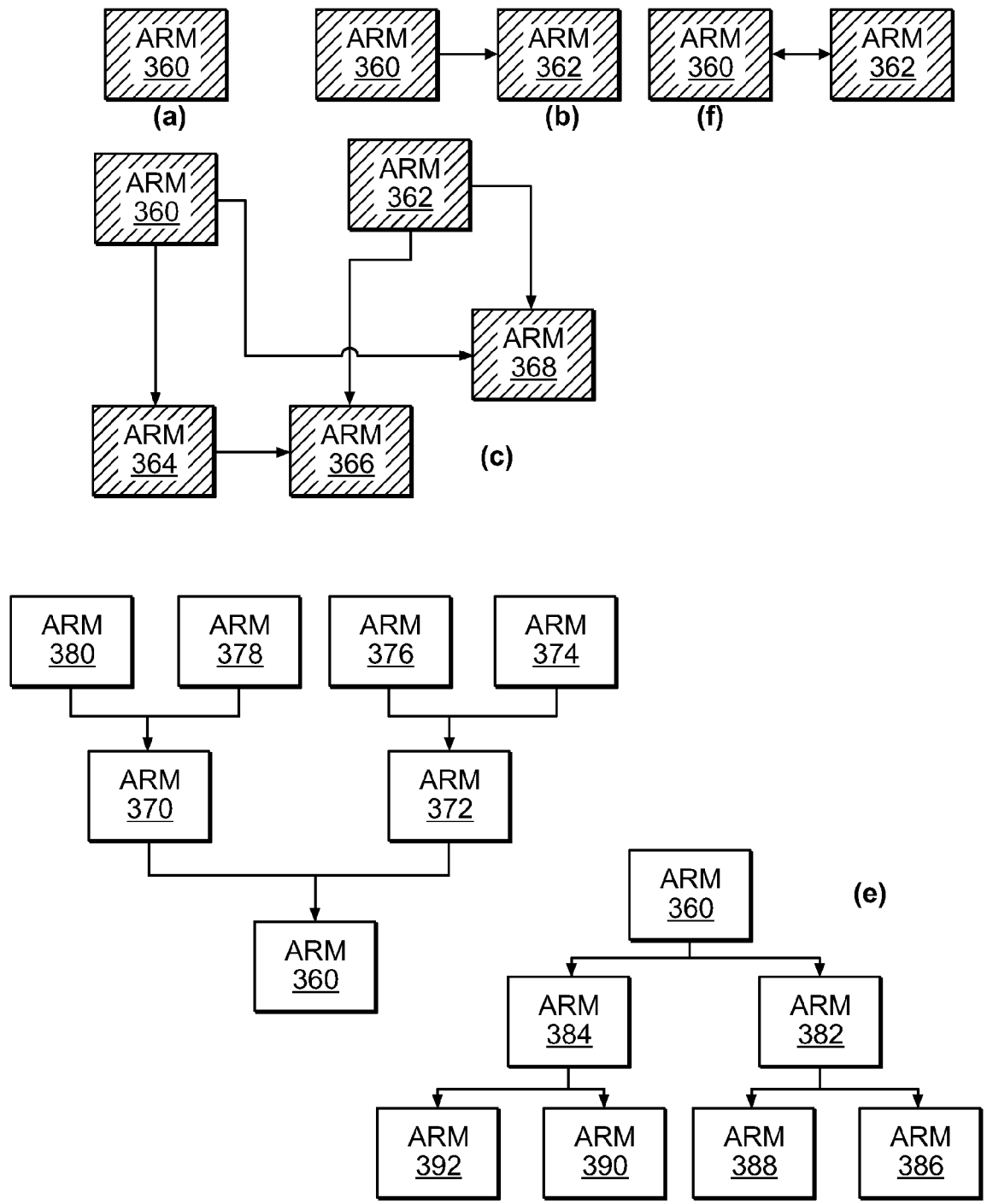
FIG. 1E illustrates various non-limiting examples of address resolution module configurations.

In some embodiments, the address space system 280 may also include multiple interconnected ARMs 124, 126 128, which may have different configurations. For example, ARMs 124, 126 128 may be in communication with one another, e.g., in a zone 102, so that when an address comes to a first ARM and the first ARM, e.g., 124, does not identify a connection with an object location, the first ARM may request the other ARMs, e.g., 124, 126, e.g., in a zone, to identify the address. FIG. 1E (a)-(f) illustrate non-limiting examples ARMs in a variety of configurations, e.g., including interconnected configurations. Examples of attributes that can change from ARM to ARM may include, but are not limited to, security, monitoring, and cell behavior. FIG. 1E(a) shows a single lone ARM 360 not interconnected to any other ARM. FIG. 1E(b) illustrates two ARMs 360, 362, where, e.g., ARM 360 may access or send an inquiry to ARM 362, but not vice-versa. FIG. 1E(f) illustrates two ARMs 360, 362, where, e.g., ARM 360 may access or send an inquiry to ARM 362, and vice-versa. FIG. 1E(c) shows an ARM 360 and an ARM 362 each interconnected to inquire of respective ARMs 364, 366 and 366, 368, with ARMs 364 and 366 similarly interconnected. FIG. 1E(d) shows a single ARM 360 at the bottom of a cascade of ARMs 370 and 372, which each are interconnected for inquiry by, respectively, ARMs 380 and 382 on the one hand and 374, 376 on the other. FIG. 1E(e) shows a single ARM 360 at the top of a pyramid of ARMs 382 and 384, with each similarly interconnected to ARMs 386, 388 and 390, 392.

Figure 2:
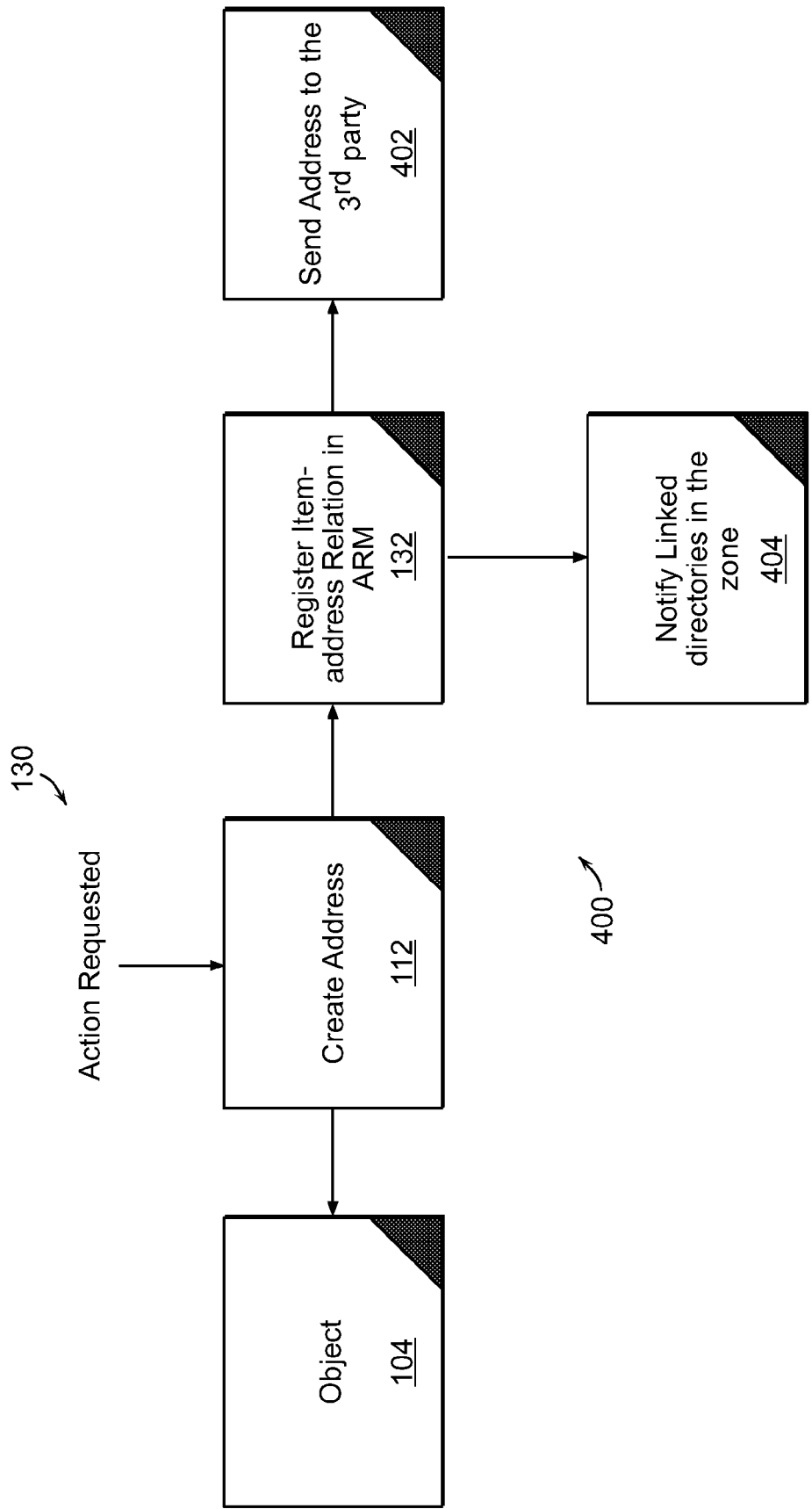
FIG. 2 illustrates an embodiment of a method for sharing access to an object hosted on a network.
Figure 14:
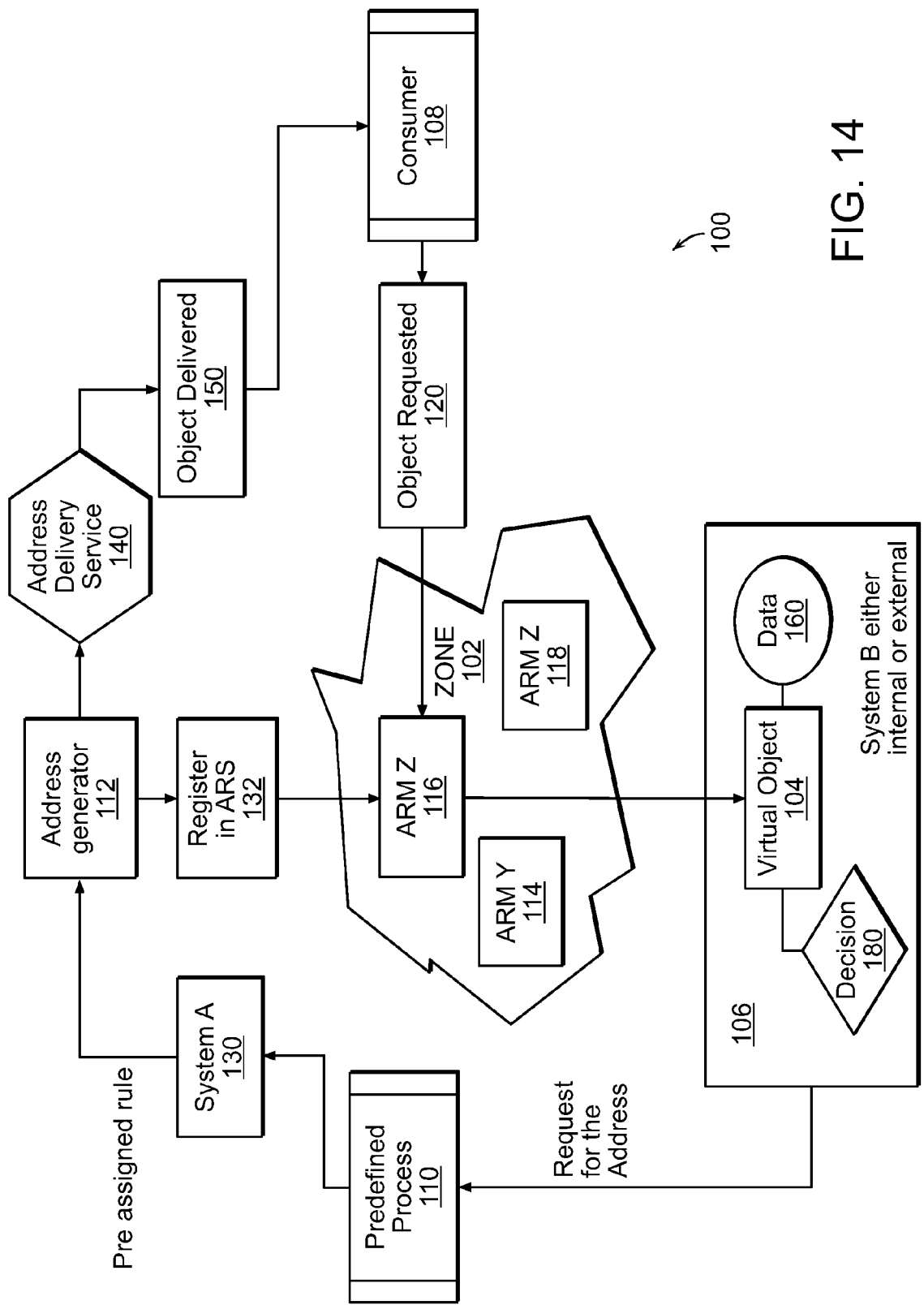
FIG. 14 illustrates a non-limiting example of object request and delivery process.

With reference to FIGS. 1A, 2 and 14, in the operation of a process 400 (in FIG. 2), for requesting and receiving an address for an object, an address may be requested for an object in step 130. As noted above, in some embodiments, the address generator 112 may be prompted to generate an address, e.g., before the object is created. Next, the address generator 112 can associate a unique address with the object 104. The relation between the address and the object 104 may then be registered in one or more ARMs in block 132 so that the object 104 may later be identified based on the address. In some embodiments, the address may not have any information about the object, but, instead, such information is stored in a cell (e.g., 150 in FIGS. 10A, 10B) in the ARM, e.g., 124 allocated to the object 104, as explained in more detail elsewhere. The registration of the address relation in an ARM, e.g., 124, may be transmitted to linked ARMs in the zone in block 404 and the address may also be sent to some appropriate third party in block 402.

In reference to FIGS. 1 and 3A, to access the object according to a process 500, as illustrated by way of example in FIG. 3A, consumers 108 who need to request an object 104 can activate a link with the address, e.g., that has previously been received from the system 100. The address is received by the system 100 through object request block 120 (FIG. 1A) and is forwarded to an ARS, e.g., ARS Z 116 in the zone 102, e.g., in order to match the address to an object, which may be done in block 502 of FIG. 3A. If the ARS 116 is able to match the address in the request as being found and validly linked to an object hosted on the system 100, the request can then is routed to the object in step 510 and, e.g., the requester can be granted access to the object in block/step 150. The address, as noted above, can be independent of the object, e.g., reflecting any change in the object. The address can point at a certain place in a work flow. If on the other hand, the ARS 116 is not able to match the address to an object in block 502, the ARS 116 may, e.g., contact one or more other ARMs in the zone or grouping of ARMs, in block/step 504, e.g., using the ARS, e.g., ARS Y, 114, in FIG. 1A, for the particular ARM. If the address is identified as valid for another ARM, then the request can be granted as described above. Otherwise, the request can be rejected in block 506.

Figure 3B:
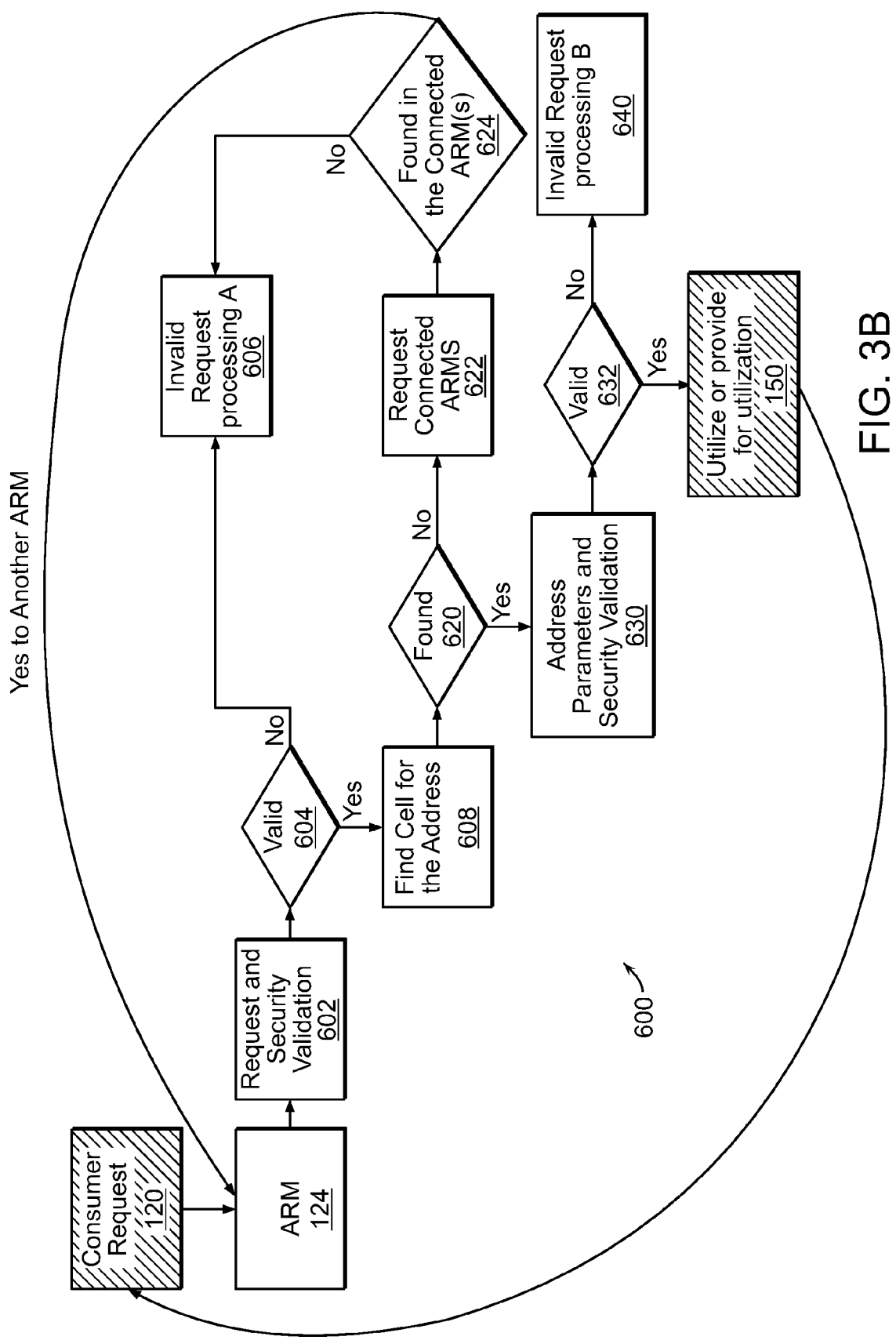
FIG. 3B illustrates an embodiment of a method for sharing access to an object hosted on a network.

FIG. 3B provides another non-limiting example of a consumer request validation process 600. The process 600 may commence in block 120 with a consumer request for an object. The request can be directed, as shown in FIG. 3A, as an example, by an ARS to the appropriate ARM, e.g., 124. The appropriate ARM, e.g., 124, may then check for request parameters, e.g., for security requirements, in block 602. The system 600 may then check the validity in a validity check block 604, and if not found to be valid, then processed in an invalid request processing A block 606. If found to be valid, then the system 600 may seek to find a cell associated with the address in block 608. If the appropriate cell is not found, then the system may request for a search of other ARMs, e.g., in a zone in block 622. If the address is so found, then the system may return to invalid request processing in block 606. If the appropriate cell is found in block 620, then the system may process cell parameters and security validation for the cell in block 630. If found valid in block 632, the user may be granted access for utilization or be provided the object for utilization in Block 150, as illustrated by way of example by the arrow back to block 120. If found invalid in block 632, then the system 600 may go to invalid request processing B in block 640, where, e.g., the user may be notified of the failure to find the appropriate cell for the given address.

In some embodiments, the systems and methods of the present disclosure can isolate and provide parts of the workflow as a single object to one isolated user. In this manner, consumers can utilize objects in the desired uniform and unique way, independently of the provider, object parameters and/or other requirements as well as of other users. The systems and methods of the present disclosure can also, e.g., isolate and provide a specific object(s) with specific parameters in a specific state(s) to each consumer in unique and secure way.

In some embodiments, systems of the present disclosure may provide access to a virtual object. As used herein, the term "virtual object" refers, e.g., to a logically combined set of one or more objects, which can be processed and represented as a single entity. Such set can be distributed across multiple entities. Virtual objects may be customized to include, e.g., a certain information and/or workflow path needed by a particular user.

In reference to FIG. 4, provider may create real objects A, 802, B, 804, C, 806, and D, 808 on the network and may grant access to these objects A-D, 802, 804, 806 and 808 to a consumer 108, as discussed above. In some embodiments, objects A, B, C, and D, 802, 804, 806 and 808, may be non-uniform objects, that is, objects of any type that can morph or change depending on a variable, parameter, function, etc. or be a superposition of objects. Examples of non-uniform objects include, but are not limited to, with respect to a form or document provider (generator), where a set of form fields differ from parameters provided by the consumer, additional dependency on content also can be present. Documents which contain links to other documents, files or both, e.g., a set of objects, such as Obj. B, 804 and object C, 806, which may be contained in a cell 802, labeled object A, 802 in FIG. 4. Also included may be, e.g., objects that exist only during a special time frame, workflow dependent objects, and/or forms or documents that can be adjusted by users. To obtain needed information regarding objects A-D consumer may need to make several calls, as shown in FIG. 4. As an example, the provider 110 may provide information to the user 108 to call object C through cell/object A, to call object B through A or to call object D. The user may then call object A, with a parameter to get to object B through object A, call object A with a parameter to get to object C through object A or call object A with a parameter to get to both object and objet C through object/cell 802. Thereby object 802 may serve, e.g., as a cell with no substantive or other useable/completable content other than reference to another object(s). As seen in FIG. 4, by way of example, these addresses for objects/cells may be provided by the provider 110 to the user 108.

Figure 5A:
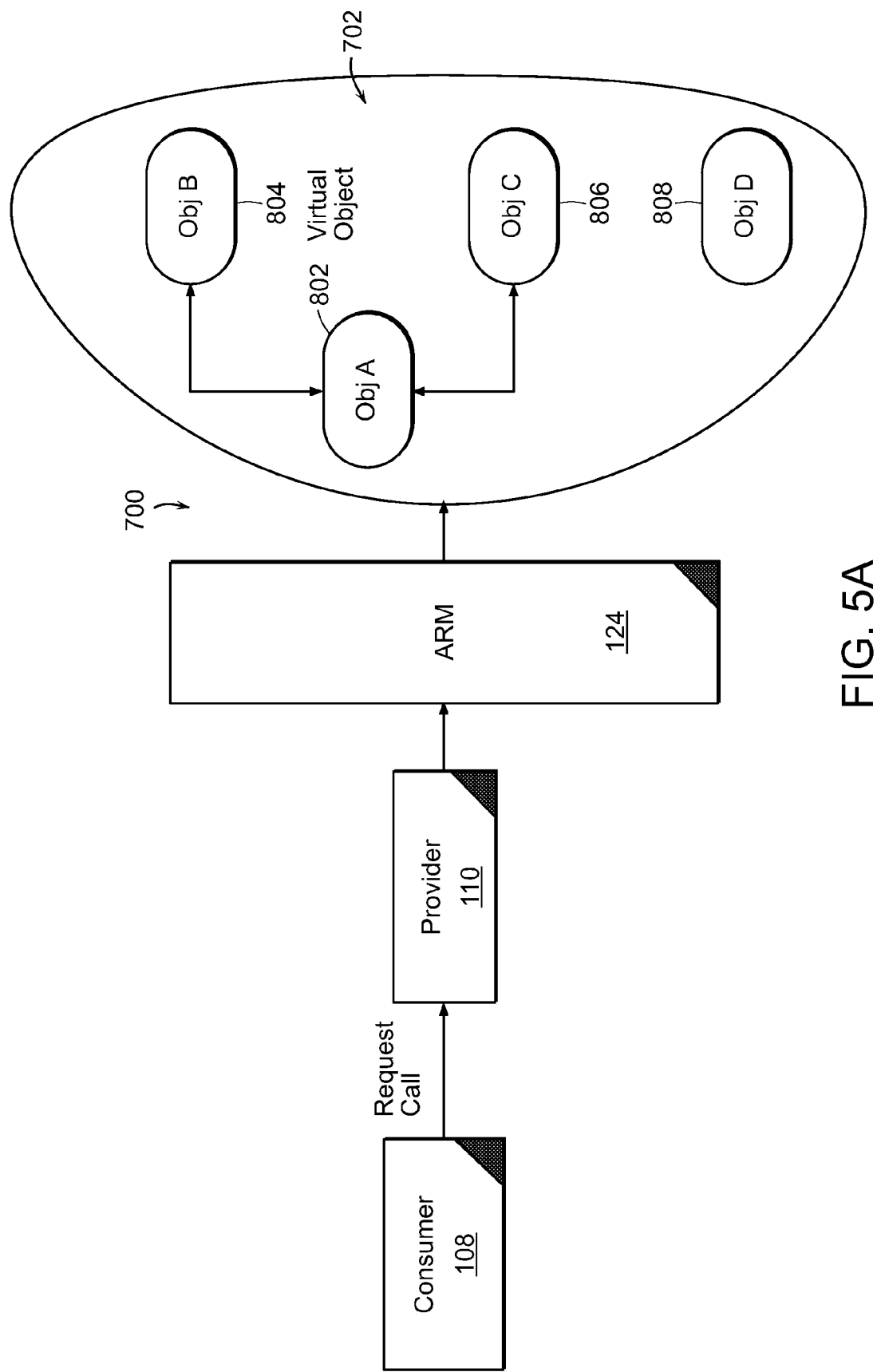
FIG. 5A illustrates an embodiment of a system hosting objects.
Figure 5B:
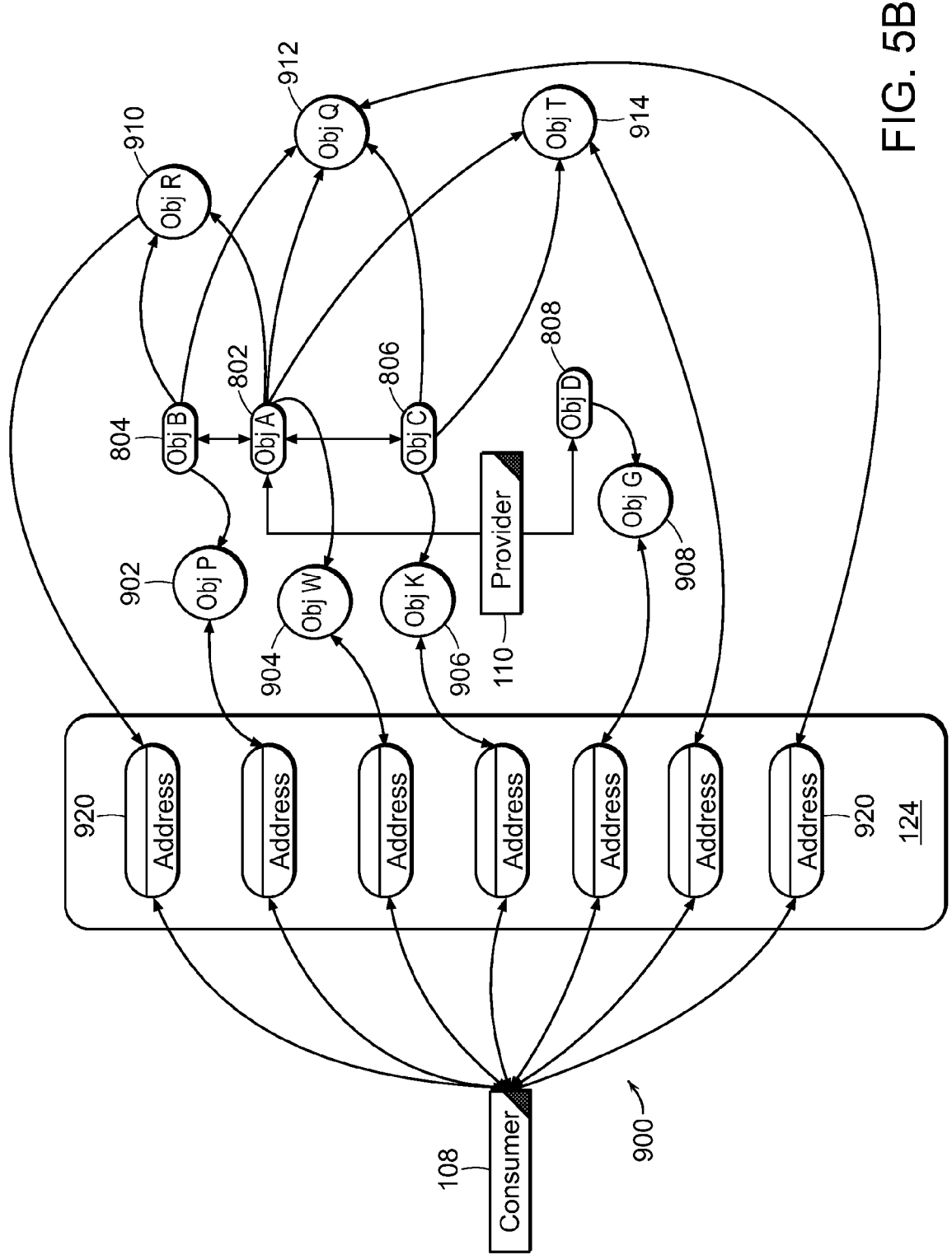
FIG. 5B illustrates an embodiment of a system hosting objects.

In reference to FIGS. 5A and 5B, in some embodiments, the system 700 in FIG. 5A illustrating an embodiment of the disclosed subject matter or 900, e.g., in FIG. 5B illustrating an embodiment of the present disclosure, may include an abstraction layer having one or more virtual objects. The abstraction layer can, e.g., enable the system to isolate and provide parts of the workflow as a single, customized object, e.g., to one isolated user. The abstraction layer can break any dependency between actual object, location, distribution, parameter(s), requirement(s) and its utilization(s) by a user. In some embodiments, according to aspects of embodiments of the presently disclosed system can, e.g., allow representing part of the workflow as a single object thus making the workflow transparent to the consumer 108. In the system and methods, e.g., 700, 900 of the present disclosure, a virtual object(s) need not exist on a physical layer, so its allocation, utilization, termination, etc. can be fully uniform for all parties. That is to say, as will be understood by those skilled in the art, virtualization can form a layer of abstraction isolating consumers from, e.g., the underlying physical/logical implementation and special requirements of objects.

In reference to FIG. 4, as described above, and FIGS. 5A and 5B, a provider 110 may first create objects A-D, 802, 804, 806 and 808 on the network. Some information in objects A-D may be relevant to a particular user 108, while other information in such object(s), e.g., may be not relevant to the particular user 108, but still relevant to other users. As shown in FIGS. 4 and 5A, the user 108 can be given access to individual objects 802, 804, 806 and 808 to gather information relevant to the user 108, e.g., through an ARM 124, FIG. 5A. As shown in FIGS. 4 and 5A, a virtual object, e.g., object/cell 702 may be created, combining information relevant to the particular user 108 from objects A-D, 802, 804, 806 and 808, while omitting information not relevant to the particular user, and grant access to the created virtual object 702, e.g., to the particular user 108, as described above. In this manner, the user 108, e.g., would only need to access a single object 702. For example, Object Q, 912 (FIG. 5B) can be, by way of example, a virtual object (such as for example, a corrective action form) that can, e.g., combine information from objects A-C, 802, 804, 806, including, without limitation, a data source(s), primary key(s) information, and a filter(s) to dependent objects (e.g., as an observation with the negative score), a related object(s) (responsibilities, etc. . . . ), and a time limitation(s). Object Q, 912, could be delivered to each responsible party, e.g., with unique information related to the party (e.g., a date(s), a corrective action(s), etc.). The state of the Object Q, 912 may be isolated from another participating object(s) (e.g., a status of a related corrective action(s), etc. . . . ) that could allow the responsible party 108 to update the information through the Object Q, e.g., on a continuous base(s) within certain time frame(s).

In some embodiments, virtual objects may include information about a process workflow to enable the process workflow to be carried out without or with only minimum intervention by the consumer(s) 108. For example, an existing virtual or real object(s) can be updated, a new real or virtual object(s) can be created, or access to a new or existing object(s) may be granted to the user or to a new user(s), e.g., based on changes in the virtual or real object(s) or other virtual or real object(s).

As can be seen in the system and process 900 of FIG. 5B, the user/consumer 108 can be given access to virtual and other objects through providing to an ARM, e.g., 124, an address 920. The ARM, e.g., 124, can then access a virtual or other object, e.g., A-D, 802, 804, 806 and 808, provided by a provider 110, or other virtual or regular objects, P, 902, W, 904, K, 906, G, 908, R, 910, Q, 912 and T, 914, with, e.g., objects P, 902, W, 904, K, 906, G, 908, R, 910, Q, 912 and T, 914 acting as regular objects, i.e., accessible directly through the ARM 124 by an associated address 920, and also through at least one other virtual object (a cell), e.g., A-D, 802, 804, 806 and 808. Virtual object/cell A, 802, accessible, e.g., through an address provided by the provider 110, can, e.g., provide further access to objects B, 804, C, 806, W, 904, R, 910, Q, 912 and T, 914, while virtual object B, 804 can provide further access to object P, 902 object R, 910 and object Q, 912, and object C, 806, also accessible from virtual object A, 802, can be a virtual object for further accessing objects Q, 912 and T, 914. Virtual object D, 808, accessible either from virtual object A, 802, or directly from an address 920 in the ARM 124, provided through the provider 110 can be a virtual object/cell for accessing object G, 908, also accessible using an address 920 in the ARM 124. It will be understood that, e.g., when the objects A-D, 802, 804, 806 and 808, are established, their addresses may be provided to the ARM from the provider, as noted above, or through, e.g., respective objects W, 914, P, 902, K, 906 and/or G, 908. Similarly, objects R, 910, Q, 912 and T, 94, when created can communicate their address 920 back to the ARM 124.

To summarize, an object, which can be, e.g., a dynamic object, file, form, method, service, procedure, function or the like, which, e.g., may or may not have associated parameters. As a dynamic object, e.g., the object may have properties and methods that are unidentified during runtime. Non-uniform objects may be any type of object that can change or morph depending upon a variable, parameter, function, etc. or be a superposition of objects. A virtual object can be, e.g., a logically combined set of object(s), which can be processed and represented as a single entity, such as a work flow, and can, e.g., also be distributed across multiple entities. An object, as is well known in the art, e.g., in object oriented programming, can have a defined state at any given time, e.g., defined by values of, e.g., a variable(s), such as data, a parameter(s), etc. and which may, e.g., form a field(s)/variable(s) depending on the programming language being used. The object, as is also well known in the art, e.g., pertaining to object oriented programming, can have a set of defined behaviors, e.g., defined as a function(s)/method(s) in some programming languages, which can provide access to modify one or more parameters of the state and/or communication between objects, as is well known in the art. Virtualization can form a layer of abstraction, e.g., to isolate a consumer(s) from the underlying physical/logical implementation and/or any special requirement(s), which layer may include virtual objects and an address for each.

As noted above, an address resolution module ("ARM") can form an entity that can match an address with a package, e.g., a "cell" containing an object and/or a another cell with an object location and parameters. The parameters may, e.g., include parameters for working with the cell, such as, an allowed number of activations, an activation time frame, a life time frame for the cell, availability of data to be accessed, etc. Such an address may be, e.g., unique globally or locally and comprise a random set of symbols that identifies the cell location in, e.g., an address space defined by and defining the ARM. The address space may consist of a range of discrete addresses, each of which may be the location of a cell within the ARM and may define also a mapping mechanism. The cell address can be uniform in the sense that it can, e.g., occur and/or be utilized independently of object variables, parameters, functions, etc. A key can identify an object, e.g., contained in a cell at a cell location, e.g., in lieu of a login that would, e.g., otherwise require using a user name and password to access the object in the cell, once the cell itself is accessed.

Figure 6:
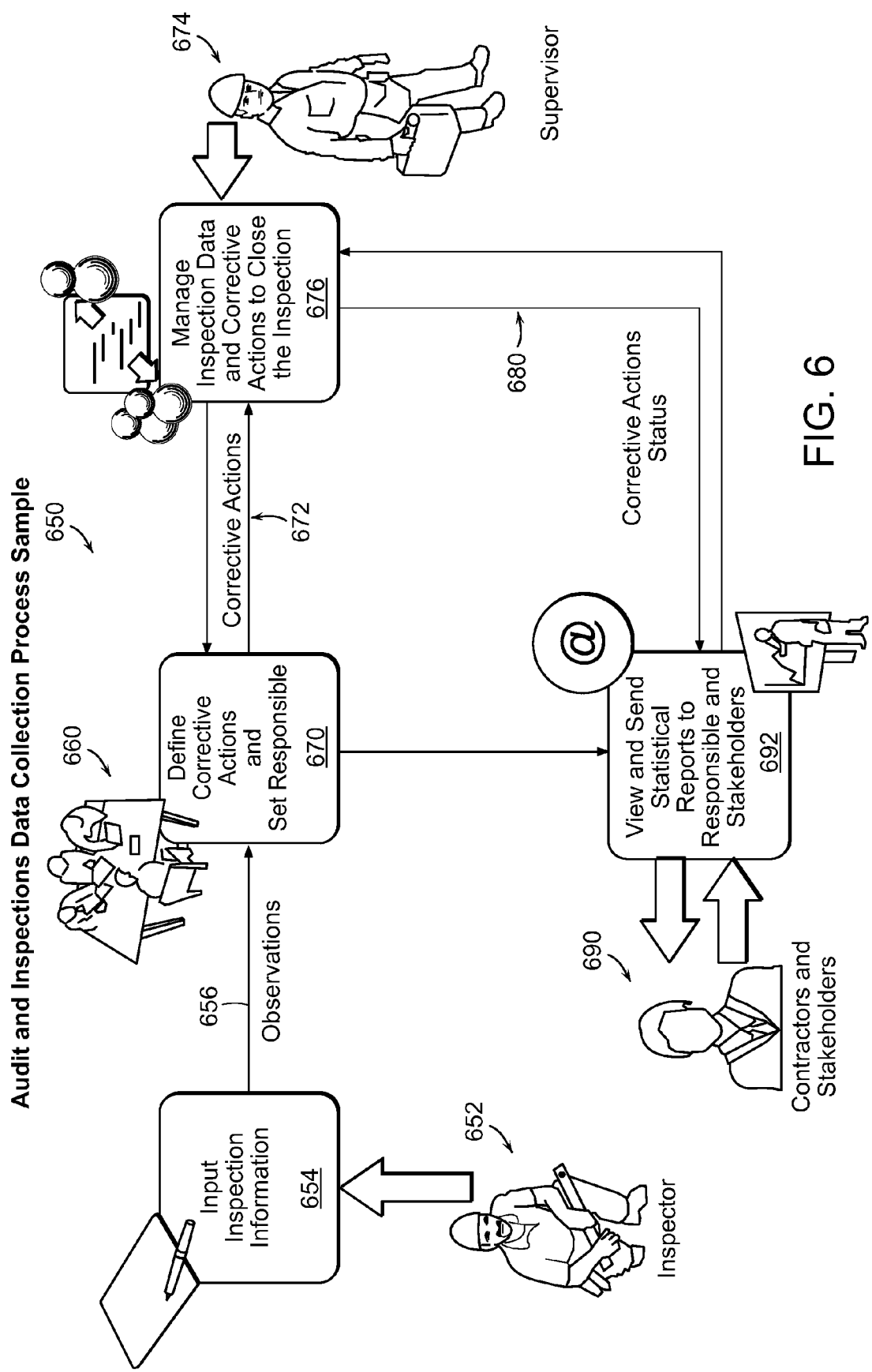
FIGS. 6-9 illustrate flow charts of various processes in connection with which aspects of the system and method of the disclosed subject matter may be employed.

FIGS. 6-9 provide non-limiting examples of processes that can be carried out using the systems and methods of the present disclosure. For example, FIG. 6 provides a flow diagram for an embodiment of an audit and inspections data collection process 650. As shown in FIG. 6, the system/process 650 may include 4 interrelated objects. In some embodiments, a real object "Input Inspection Information" 654 may be created by one or more inspectors 652. Based on the information 656 in the "Input Inspection Information" object 654, one or more virtual objects "Define Corrective Actions and Set Responsible" 670 may be created, e.g., by a reviewing entity 660, each specific to one or more particular users, e.g., a supervisor(s) 674 and/or a contractor(s) shareholder(s) 690 who may, e.g., be given access to these corresponding one or more virtual objects 670. As the one or more virtual objects "Define Corrective Actions and Set Responsible" 670 progress(es), such as for example, corrective actions 672 being defined and responsibilities set, additional virtual objects, e.g., 676 and 692, discussed below, may be set up for the same or additional users so that the corrective actions 672, 680 can be carried out and reported.

In some embodiments, virtual objects may also include information about the process workflow 650 so any existing virtual object(s), e.g., 670 may be updated or new virtual objects 676, 692 may be created based on changes in an object. For example, as the object "Manage Inspection Data and Corrective Actions to Close Inspection" 676 is updated, that object may be utilized to prompt an update of a virtual object "View and Send Statistical Reports to Responsible Shareholders" 692. Moreover, if necessary, a new virtual object 692 may be created, e.g., for a responsible contractor/stakeholder 690 not previously involved in the process 650 and an address may be sent to such contractor/stakeholder 690 to grant him or her access, as described above, to the newly created virtual object, e.g., 692.

Figure 7:
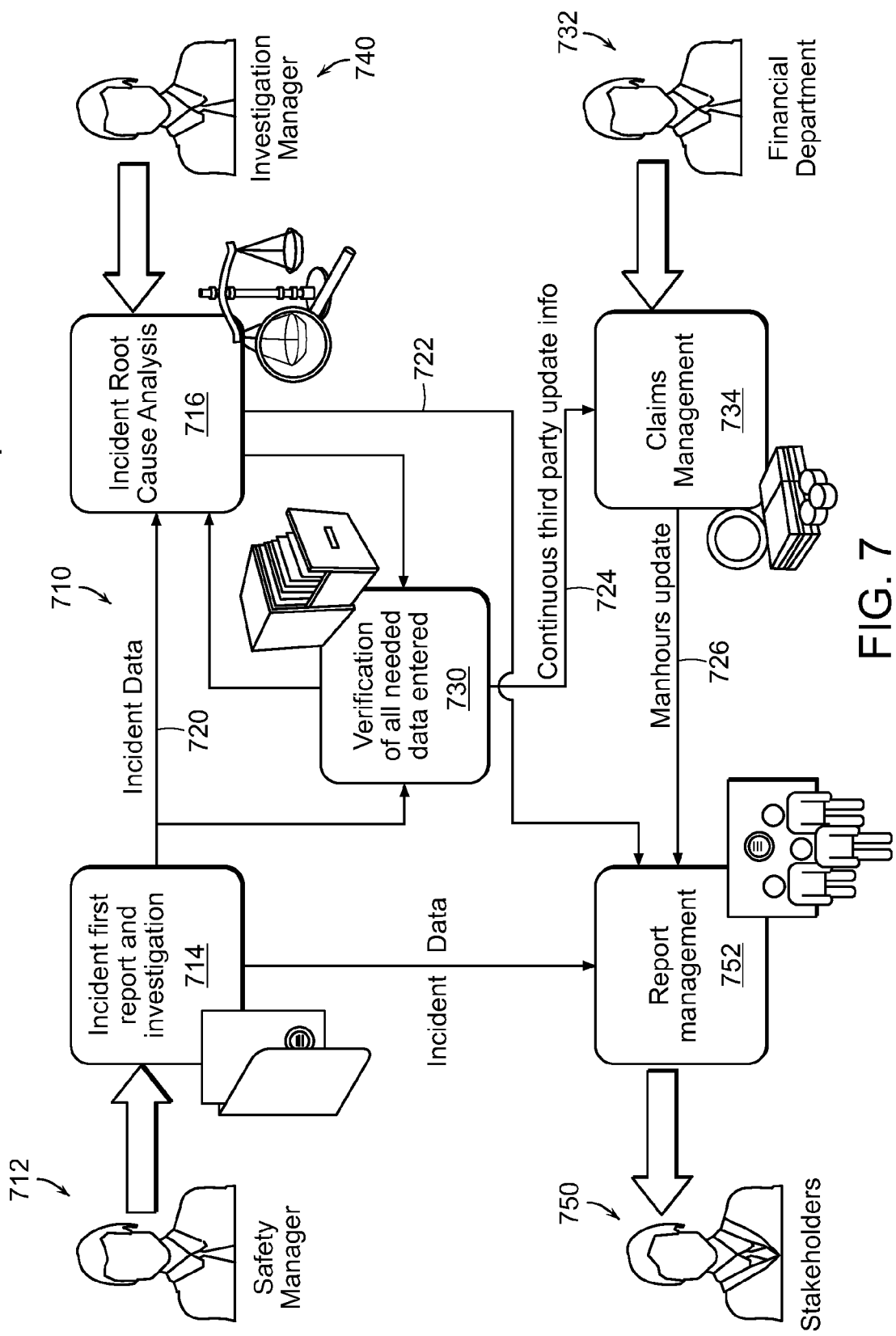

As another example, illustrated in FIG. 7, a process/work flow diagram 710 for an embodiment of an incident data collection process work flow process 710 can be implemented. As shown in FIG. 7, the system/process 710 may include 5 interrelated objects. In some embodiments, a real object "Incident First Report and Investigation" 714 may be created by one or more entities, e.g., a safety manager 712. Based on information ("Incident Data" 720) contained in an "Incident First Report and Investigation" real object 714, one or more virtual objects, e.g., "Incident Root Cause Analysis" 716, "Verification of All Needed Data Entered" 730 and "Claims Management" 734 may be created, e.g., by a reviewing entity ("Investigation Manager" 740) and a reviewing entity "Financial Department" 732, each specific to one or more particular users, e.g., Stakeholders 750, who may, e.g., be given access to these corresponding one or more virtual objects 716, 730, 734. As the one or more virtual objects 716, 730, 734, progress(es), such as for example, "Incident data," 720, Root cause analysis," 722, "Continuous third party update info," 724, being defined and responsibilities set, additional virtual objects, e.g., "Claims Management," 734 and "Reports Management," 752 may be set up for the same or additional users, e.g., a Financial Department 732 or Stakeholders 750, so that the Incident Data Collection Process 710 can be further carried out and reported.

In some embodiments, virtual objects 716, 730, 734 may also include information about the process/workflow 710 so existing objects 716, 730 may be updated or new objects 734, 752 may be created based on changes in an object. For example, as the virtual object "Incident Root Cause analysis" 716 is updated, and as the virtual object Verification of all needed data entered" 730 is updated, those virtual objects 716, 730 may be utilized to prompt an update of the virtual object "Claims Management" 734. Moreover, if necessary, a new virtual object "REports Management," 752 may be created, e.g., for a responsible stakeholder 750 not previously involved in the process 710 and an address may be sent to such stakeholder 750 to grant him or her access, as described above, to the newly created virtual object, e.g., 752.

Figure 8:
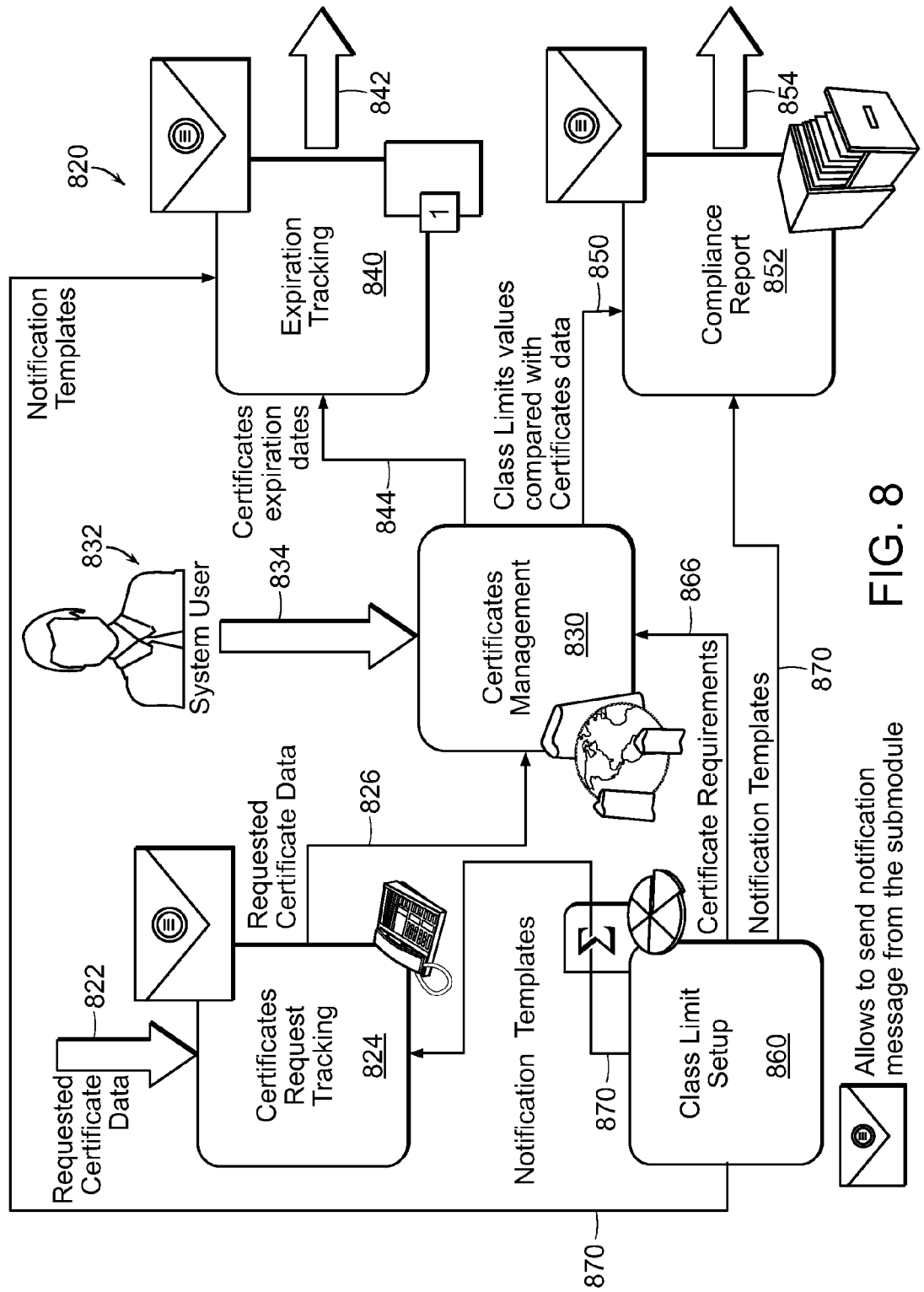

As illustrated by way of example in FIG. 8, another process/work flow diagram 820 for an "Insurance Data Collection Process" is shown. The process 820 illustrates a work flow using what may be considered 5 virtual objects, "Certificate Request Tracking," 824, "Certificates Management," 830, "Expiration Tracking," 840, "Class Limits Setup," 860 and "Compliance Report," 852, though both the "Certificate Request Tracking," 824 and "Class limits Setup," 860 objects could be considered at least mainly real objects, principally acting to provide input information, i.e., regarding what certificates to track and manage and requested certificate data, respectively.

A system user 832 can be considered as a creator of a real object "Certificates Management," 834, and virtual objects "Expiration Tracking," 840 and "Compliance Report," 852 can be considered the outputs, e.g., 842, 854, respectively, to stakeholders (not shown). An object "Class Limits Setup," 860, which may be considered real or virtual, provides an input "Notification Templates," 870 to the virtual object 840, and to virtual object "Compliance Report," 852 and to the object "Certificate Request Tracking," 824, and input "Certificate Requirements," 866 to the object "Certificate Management," 830. The "Certificate Request Tracking," object 824 provides "Requested Certificate Data, 826 input to the object "Certificates Management," 830. The object "Certificates Management," 830 can be utilized to provide input certificates expiration dates," 844 to the object "Expiration Tracking," 840. The object "Certificates Management," 830 can be utilized to provide input "Class Limits values compared with Certificates data," 850 to the object "Compliance Report," 852.

Figure 9:
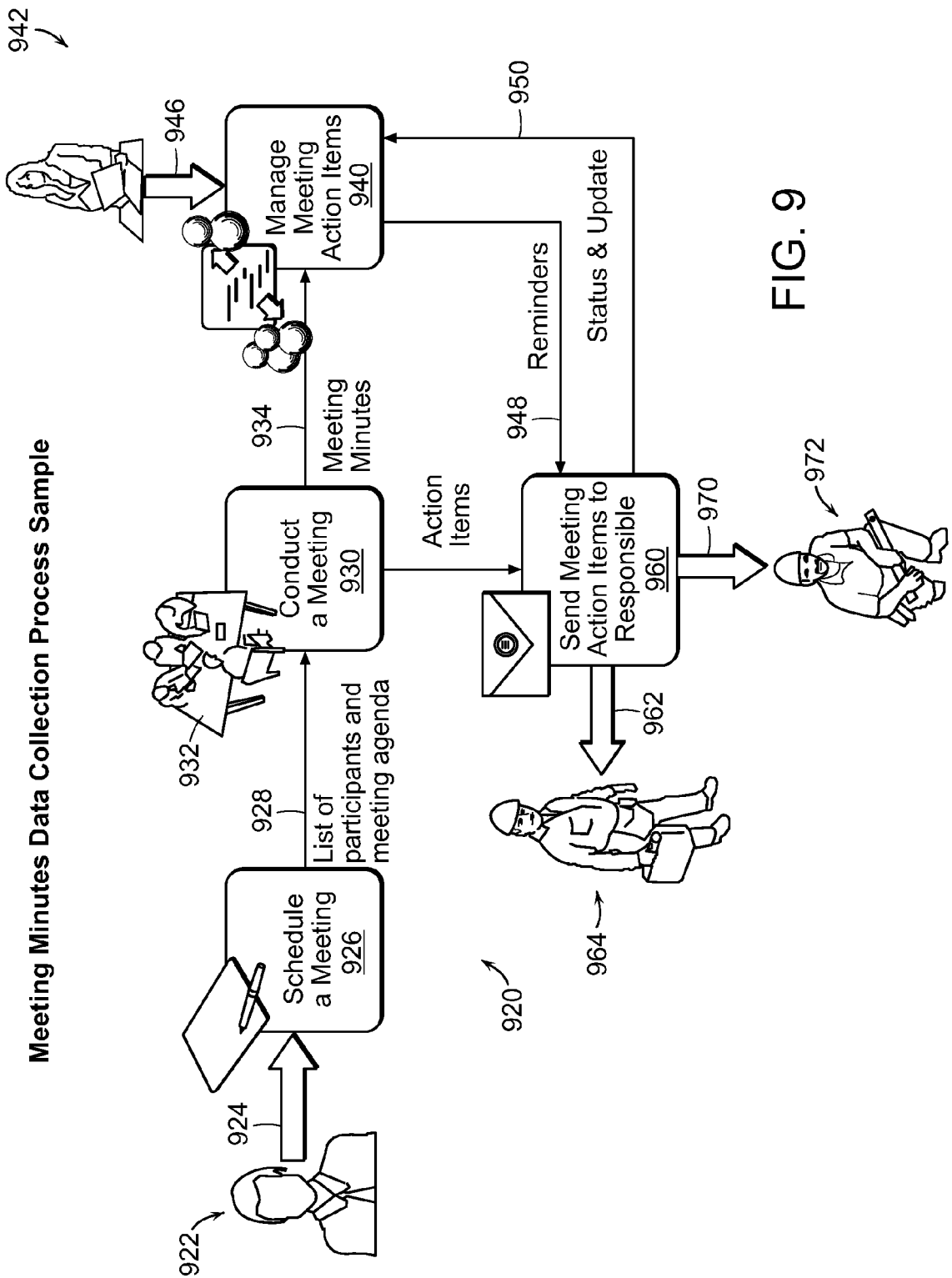

FIG. 9 illustrates a process/work flow diagram 920 for a "Meeting Minutes Data Collection Process," in which, e.g., a real object creator 922 provides input 924 which schedules a meeting as indicated in the contents of a real object "Schedule a Meeting," 926. The contents of the real object 926 can be provided to a virtual object "Conduct a Meeting," 930, as, e.g., a "List of participants and a meeting agenda," 928. A meeting entity 932 can then conduct the meeting and produce a set of "Meeting Minutes," in a virtual object 934, which may be forwarded to another virtual object "Manage Meeting Action Items," 940, e.g., for utilization by a facilitator 942 to produce input 946, e.g., in the form of action item reminders 948. The reminders 948, may then be accessible by outside users, e.g., a supervisor(s) or an inspector(s) 972 through a virtual object "Send Meeting Actions Items to Responsible Entity(ies) 960, in the form of outputs 962 and 972 respectively.

Access, e.g., to associated objects/virtual objects, may be monitored, renewed, revoked, etc., automatically. Access scope may also be expanded or limited, e.g., by the expansion or limitation of the object scope, e.g., the scope of further access to a further object(s), and also, e.g., with a special authentication/credential requirement, if necessary). In some embodiments, e.g., integration may not be required, e.g., if one entity is required to provide access to an object (to, e.g., collect data, show a report, etc.) to another entity. No integration, synchronization or replication of user access lists may be necessary, e.g., to provide access across the entity to the object, which can, e.g., eliminate the need for employing support teams, help desks and developers.

Figure 10A:
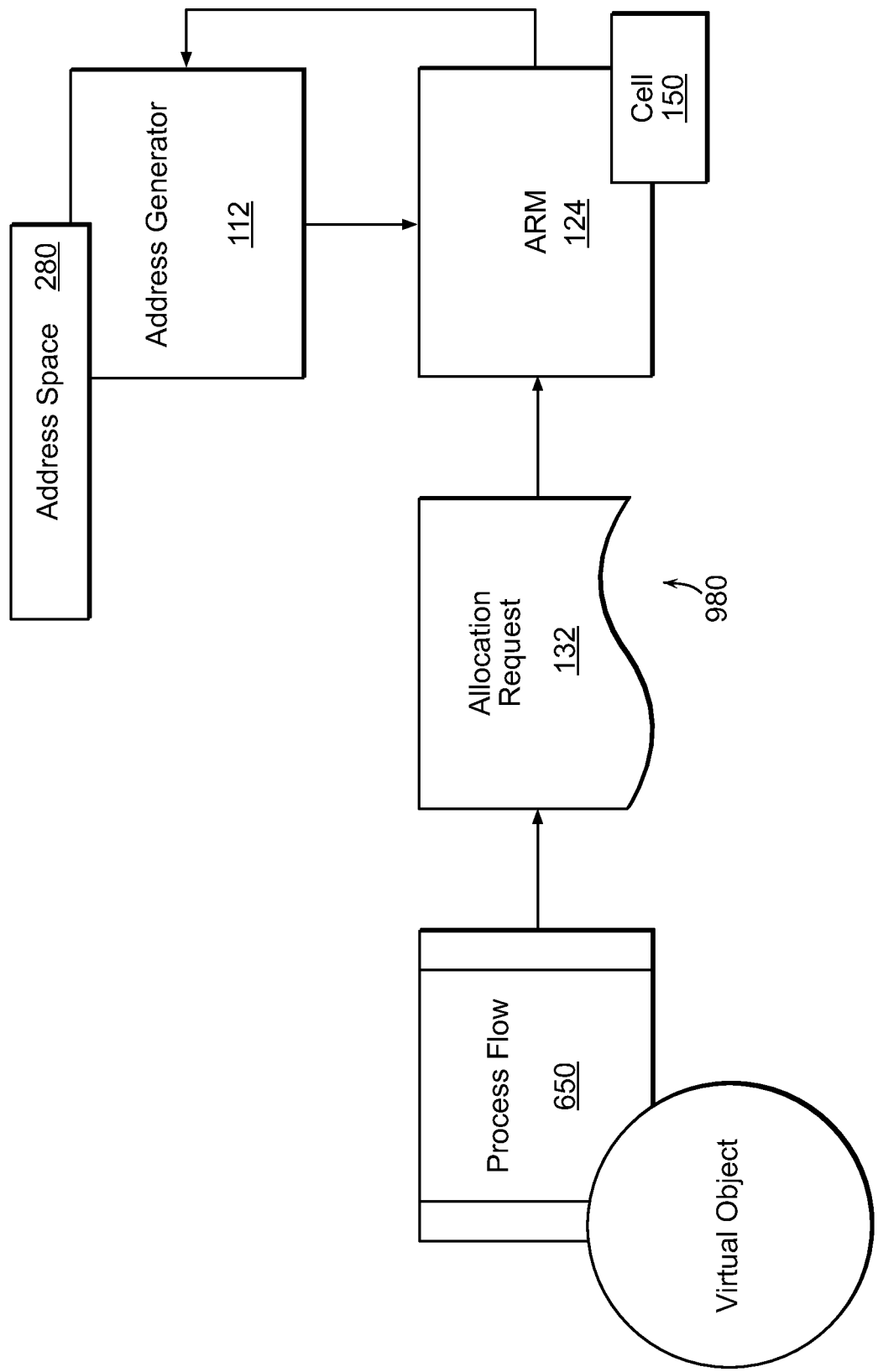
FIG. 10A illustrates allocating address and object information to a cell in an address resolution module, according to aspects of embodiments of the disclosed subject matter.
Figure 10B:
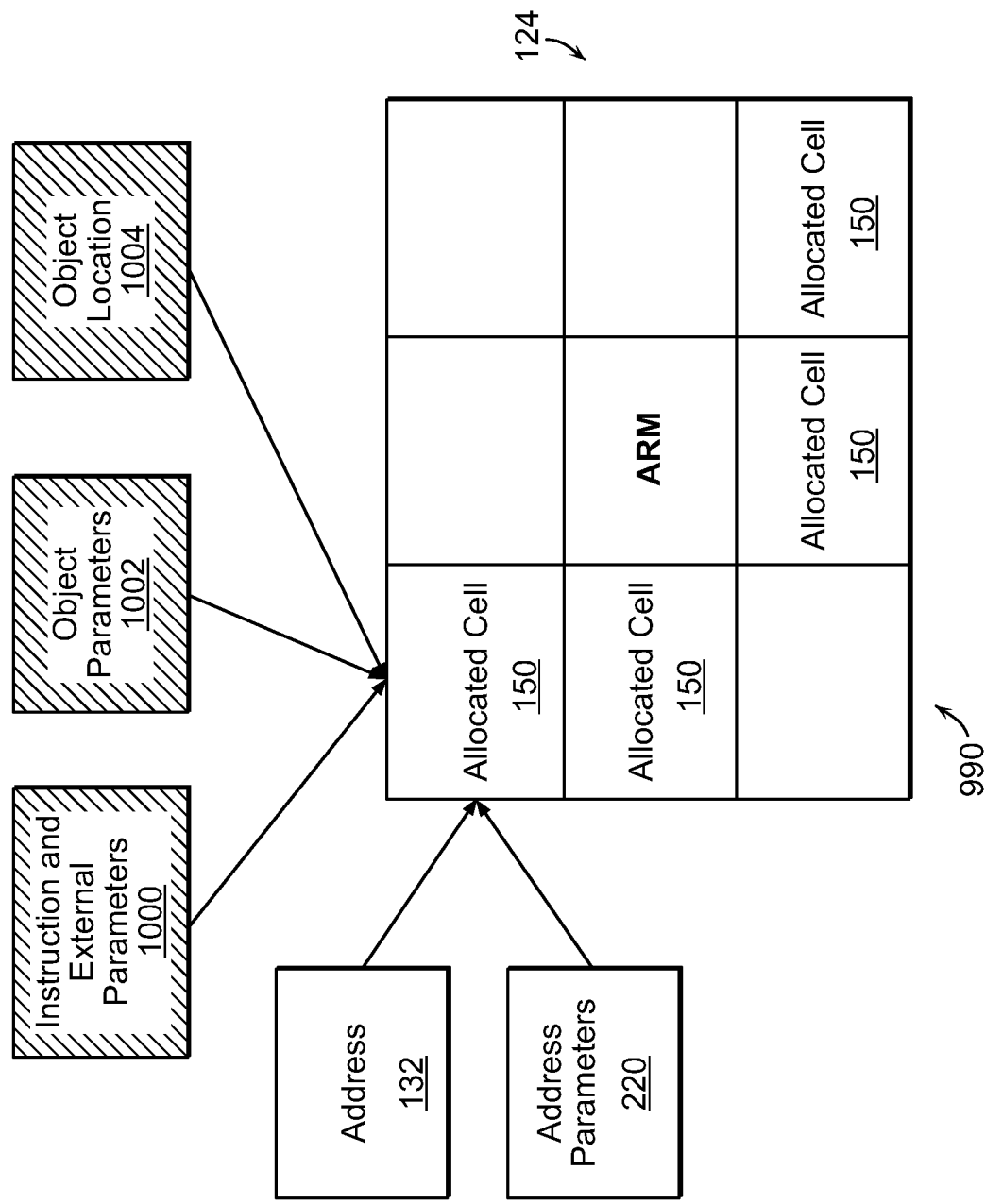
FIG. 10B illustrates a non-liming example of a workflow and object placement into a cell in an ARM.

In some embodiments, a cell (virtual object) in an ARM may be created that can include information about both an address and a corresponding virtual object. FIGS. 10A and 10B provide exemplary systems and process(es) 980, 990 of allocating an address 132 and an address parameter(s) 220 of a virtual object to a cell 150 in an ARM, e.g., 124. The allocation of an address requested of the ARM 124 in the allocation request block 132 can be accomplished by the address generator 112 selecting an address from an address space 280 for placement of the object in the4 ARM 124 at a location for a cell 150 identified by the selected address which can then be requested it by a consumer by following the address. Also allocatable to the particular cell 150 can be an instruction(s) and an external parameter(s) 1000, an object parameter(s) 1002 and/or an object(s) location(s) 1004.

In reference to FIG. 10B, an allocated cell 150 can be, e.g., provided with information about an address 920, such as, for example, the address 920 itself and an address parameter(s) 220 (limit on the lifetime of the address 920, how many different users can use the address 920, etc.). Upon request for an address 920 for a cell 150, the cell 150 may also be populated with an object(s), e.g., a virtual object(s), along with, e.g., also an object parameter(s), an object location(s) and an instruction(s) and an external parameter(s)s. Object location can be, e.g., the location of the object in the network which can, e.g., allow the system 980, 990 to direct a user 108 to the object 150. An object parameter(s) may include information that needs to be provided to a user/consumer 108 with the address 920 associated with the cell 150. In some embodiments, the object 150 may be a virtual object and the system 980, 990, and a cell allocated to the virtual object(s) 150 may include parts of the workflow process, 650, FIG. 6, 710, FIG. 7, 820, FIG. 8 and/or 920, FIG. 9, which may be stored somewhere else on the system, to include, e.g., directions on, how to assemble the virtual object 150, how to utilize information entered in the virtual object 150 and what parties to notify when the virtual object 150 has been updated or tasks in the virtual object 150 have been performed. Alternatively or additionally, some or all object 104 or virtual object 150 related information may be stored in the object 104 or virtual object 150 itself rather than in a virtual object/cell allocated to the object 104 or virtual object 150.

In reference to FIG. 10B, an exemplary ARM 124 internal structure is shown. In some embodiments, cells 150 may have the following cell memory and structure: Memory space can be the same for all consumers 108. Memory space can be shared. Memory structure can be is linear, which may not allow for optimization. Memory structure may be such as to not require garbage collection. Memory structure may be such as to not allow sorting. Cell 150 size can be flexible, and may be allocated randomly in any given address space. There may be no way/need to check if such a cell 150 was/is/will be allocated globally. There may be no way/need to itemize allocated cells globally. There may be no way/need to enumerate allocated cells globally. There may be no way/need to predict future allocations. Cell 150 allocation can be independent from the platform, and a cell may be such as to only be used during a specifically set life span and disposed of afterward, e.g., so that there is no cell reuse. There may be no way to recover the address of an allocated cell after such use. The address of a cell can be such as to have no correlation with cell content. A cell can store code and/or data and/or an address(es). Each cell can also be isolated in terms of the space, (e.g., it has not information about any cells nearby, e.g., to identify such a nearby address). A Cell(s) can be relocated anywhere, including, e.g., without a need to change its address. Examples of allocated cell properties include, but are not limited to, Address; Cell with/without Content; Access start time and date; Access end time and date; Number invocations and Key to identify the same objects locally.

The systems and methods of the present disclosure may be used in a variety of applications. In some embodiments, the presently disclosed methods may be used for integration of database systems. As an example, a System A (provider) may need to receive data, e.g., into a specific data point once a month from a System B (consumer) in a such way that only this consumer system can send its data, e.g., during the limited period of time only into this data point, e.g., without credentials and management from any party. The system may, e.g., be integrated according to the following protocol, e.g., with a time of once a month for 3 days.

First, a cell access provider can request allocation of a cell in an ARM. In response, the ARM can allocate a cell and return the cell address to the provider. The provider can then, e.g., put data reception initiation parameters and an internal calling location into the cell (such parameters may be: data point origin, data storage number, data format, data validation rules). The provider may then, e.g., send an import request to the consumer. Upon receipt, the consumer can send data to the address in the ARM. The ARM can then validate the address and verify if such cell was allocated. The ARM can then send received data to the object in the cell. The Provider's data receiver can process the data and send data processing results back to the ARM. The ARM can then receive such input from the data receiver and send it to Consumer, which can then import the received data processing results.

FIG. 11 illustrates a non-liming example of a workflow 990 and object placement into a cell 150 in an ARM 124, as discussed with respect to FIG. 9. In addition, there is illustrated a workflow of a process, such as illustrated in FIGS. 6-9, illustratively indicated by the workflow 650 of FIG. 6, having objects 1, 1010, 2, 1012, 3, 1014, 4, 1016, 5, 1018 and 6, 1020. The objects 2, 1012 and 3, 1014, communicate with the "Object Parameters," box 1002 and the object 6, 1020, points to cells in the ARM 124.

Figure 12:
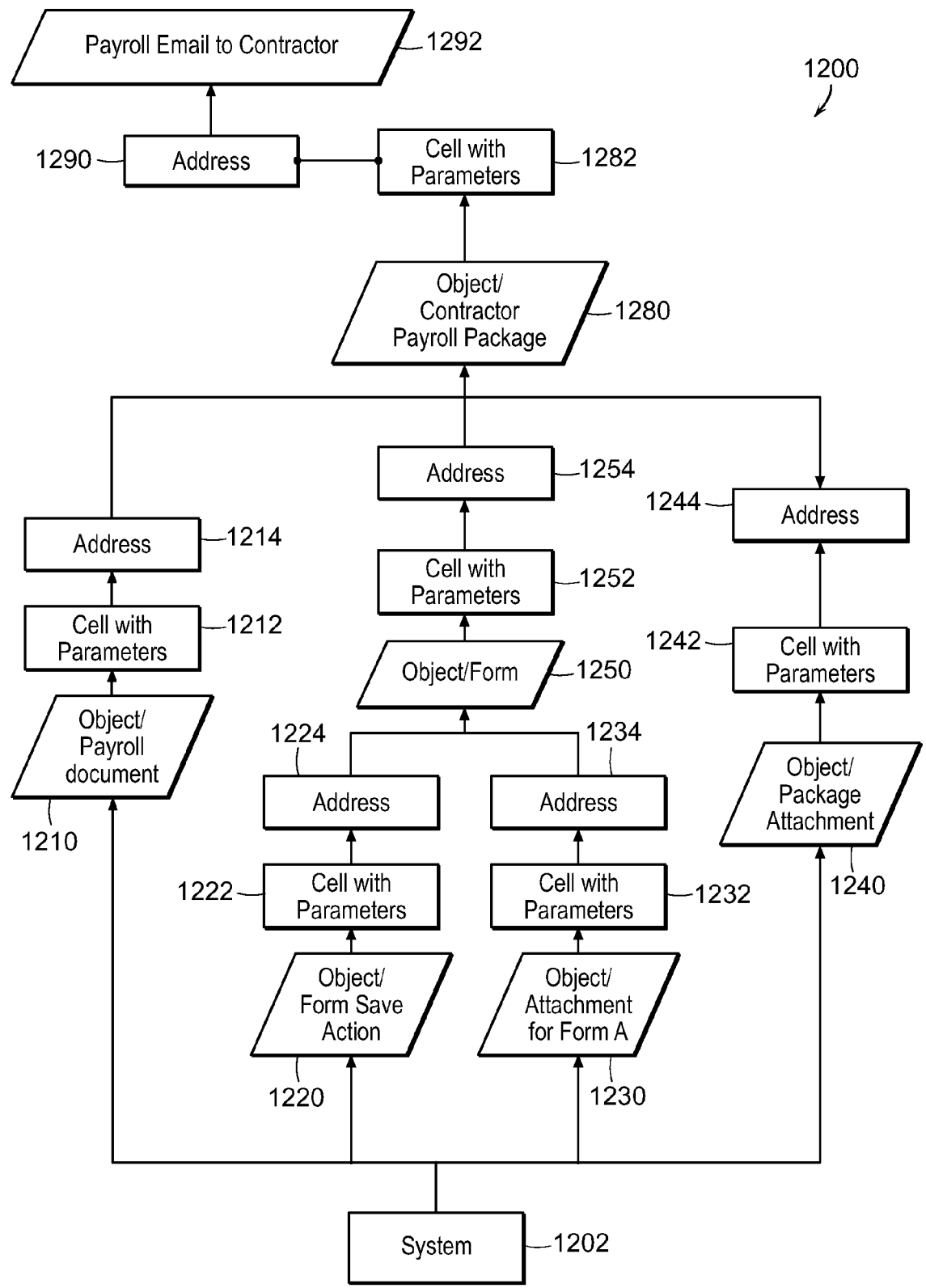
FIGS. 12 and 13 show non-limiting examples of using the methods and systems of the present disclosure for payroll processing.
Figure 13:
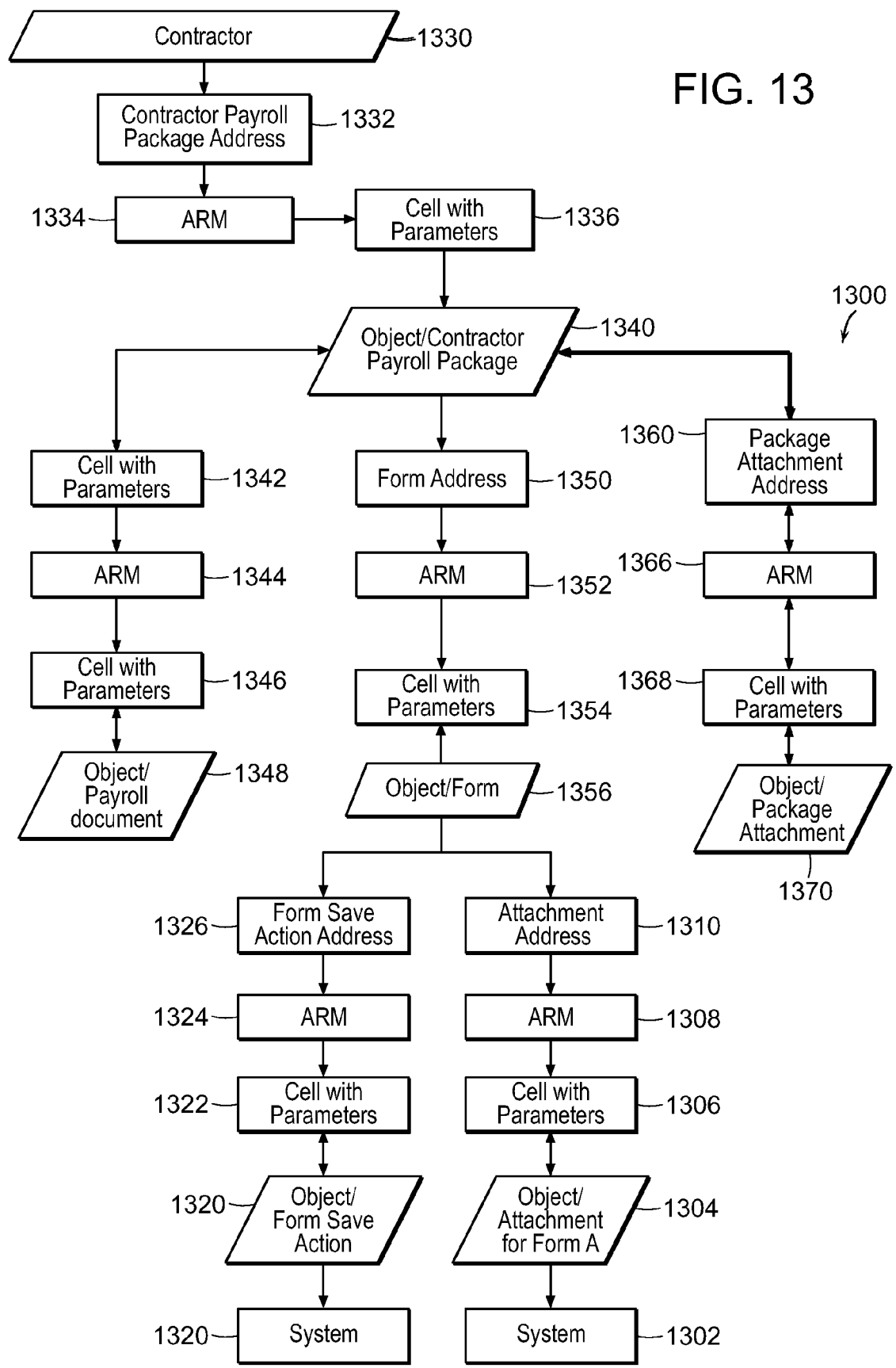

In reference to FIG. 12 and FIG. 13, the embodiments of methods and systems of the present disclosure can be used for payroll collection, and in particular, for a payroll collection process 1200, 1300 related to construction projects. Goal of the process 1200, 1300 may be, e.g., to collect payroll from subcontractors without any need for a primary contractor or project management to intervene. The system/method 1200 can, e.g., send an email 1292 with an address 1290 link to a payroll package 1280 to each sub-contractor 1330 (FIG. 13) in a way that each sub-contractor receives its own set of documents and forms. As an example, a system 1202 of a sub-contractor can create, e.g., an object 1210 in the form of a payroll document, in a cell 1212 with parameters and an address, 1214, an object 1220, "Form Save Action," in a cell 1222 with parameters and an address 1224, an object 1230, "Attachment for Form A," in a cell 1232 with parameters 1232 and an address 1324 and an object 1240, "Package Attachment," in a cell 1242 having parameters and an address 1244, as shown in FIG. 12. The addresses and parameters and content form the cells 1222 and 1232 may be combined in a virtual object 1250 "Form," in a virtual cell 1252, with parameters and an address 1254, and the addresses 1214, 1254 and 1244 may be combined in a virtual object "Contractor Payroll Package," 1280 for inclusion in a cell 1282 with parameters and an address 1290, which may be sent, e.g., in an email 1292 to the subcontractor.

Each subcontractor can reply from its own set of documents and forms, as shown, e.g., in FIG. 13. The contractor, in block 1332 can apply the address 1290 received by the contractor in the email 1292 to an ARM in block 1334. The ARM can then identify A cell with parameters in block 1336, which can point to the appropriate virtual object "Contractor Payroll Package," 1340 created as 1280 in FIG. 12. Similarly, the addresses created in blocks 1214, 1254 and 1244 can be applied in blocks 1342, 1350 and 1360, respectively, to access, through an appropriate ARM in blocks 1344, 1352 and 1366, the object "Payroll Document," 1348, applying cell parameters 1346, if any, the virtual object 1356 applying the cell parameters, if any, in block 1354 and the object 1370, applying the cell parameters, if any, in block 1368. Virtual object "Form," 1356 allows for access to the respective objects "Form Save Action," 1322 (object 'Form Save Action," created and/or stored in block 1220 in FIG. 12) and object "Attachment for Form A," 1304 (object "Attachment for Form A, created and/or stored in block 1230 in FIG. 12), through the utilizations of the respective addresses in blocks 1326 and 1310, in the respective ARMs in blocks 1328 and 1308, utilizing the respective cell parameters, if any, in blocks 1324 and 1306, to access in blocks 1322 and 1304 the appropriate objects 1220 and 1230 created by the system 1202 in FIG. 12. Systems 1320 and 1302 may be interfaced from the respective form and attachment in the respective blocks 1322 and 1304.

FIG. 14 illustrates a non-limiting example of an object request and delivery process 100, which is essentially the same as the similar process 100 of FIG. 1A, with the exception that object 104 is a virtual object pointing to objects "Data," 160 and "Decision," 180 in the internal or external system 106 and the System B can also make a request in block 110 to the provider for an address allocation.

The systems of the present disclosure can perform at least one aspect/functionality of the various steps and embodiments described herein in real-time (or "in real time") and/or dynamically. As used herein, the term "real-time"/"in real time" means that an event/action occurs instantaneously or almost instantaneously in time when another event/action has occurred. As used herein, the term "dynamic(ly)" means that an event/action occurs without any human intervention.

In some embodiments, at least some functionalities or steps of the systems and methods of the present disclosure can be carried out on a network, which can include any communication method by which information may travel between computing devices. The network may include various hardware, software systems, network protocols, or combinations thereof. The network 102 can typically be the Internet, a local area network (LAN), a wide area network (WAN) or other types of networks, including but not limited to, a Bluetooth® network, a USB network, direct connections, such as through a universal serial bus (USB) port, other forms of computer-readable media, or any combination thereof. The network 102 may be a single network or may be comprised of multiple interconnected networks, having the same or different architecture or protocols.

Figure 15:
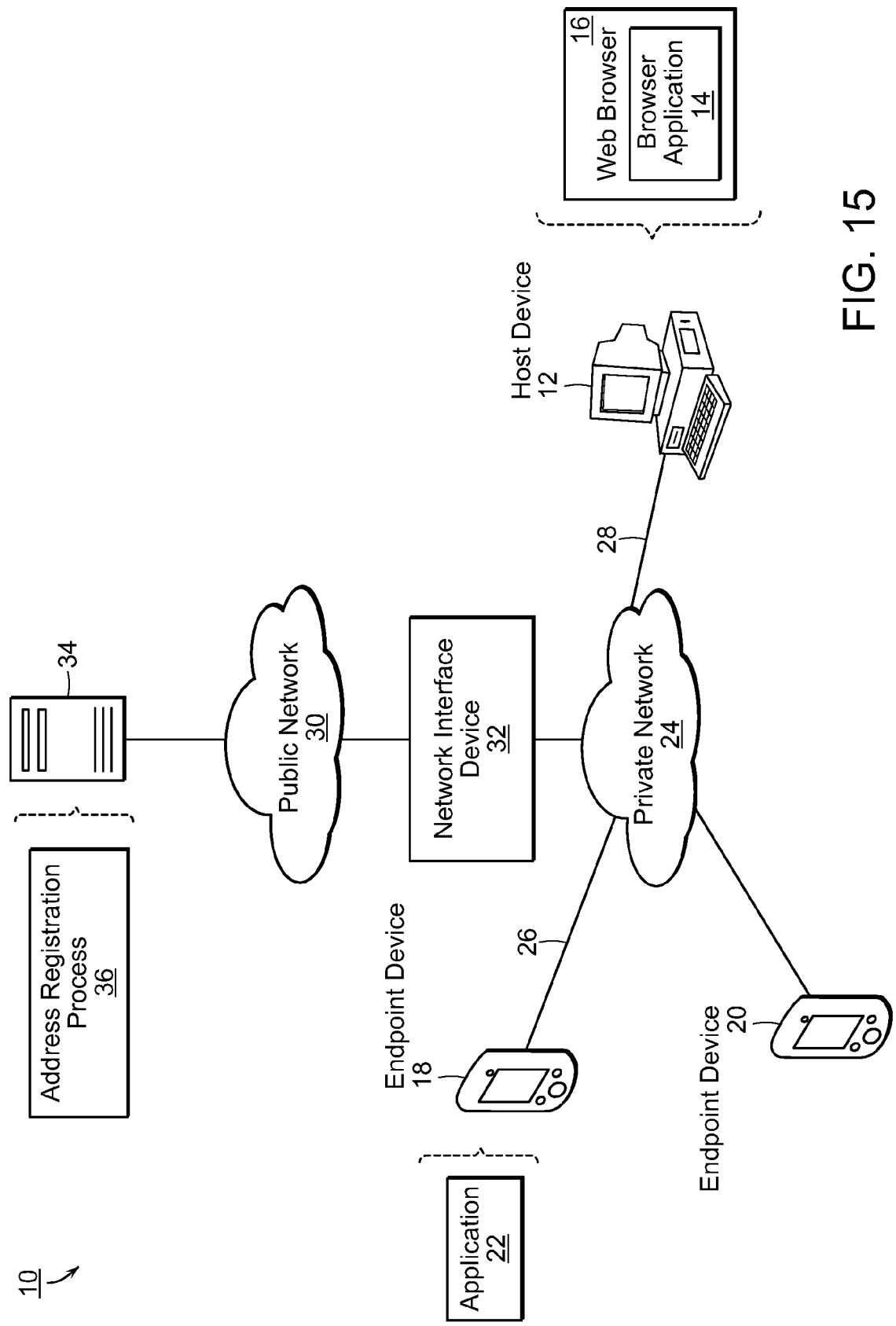
FIG. 15 illustrates an embodiment of an environment in which the methods and systems of the present disclosure may operate.

FIG. 15 illustrates one embodiment of an environment in which the system 10 of the present disclosure may operate. However, not all components illustrated in FIG. 15 may be required to practice the embodiments of the present disclosure, and variations in the arrangement and type of the components may be made without departing from the spirit or scope of the present disclosure. In some embodiments, the instant invention can host a large number of persons and concurrent transactions. In other embodiments, the instant invention can be based on a scalable computer and network architecture that incorporates various strategies for assessing the data, caching, searching, and database connection pooling. An example of the scalable architecture is an architecture that is capable of operating multiple servers.

In reference to FIG. 15, in some embodiments, the system 10 may include a host device 12 capable of executing software applications and processes, such as, by way of non-limiting example, the software of the presently disclosed system. In some embodiments, such software may be located locally on the host device 12 or on a remote server 34 to which the host device may connect via a network. The software may be executed within web browser 16 or directly on the host device 12.

FIG. 15 shows host device 12 as a desktop computer, however host device 12 is not limited to desktop computers. For example, host device 12 may be a laptop computer, server computer, game console, personal electronic device, mobile electronic device, such as for example, a smart phone, personal digital assistant or similar handheld device, internet television, home appliance, network- and processor-enabled remote control toy, internet enabled billboard, iPad®, iPhone®, BlackBerry® or any other device capable of running software applications and processes, such as software of the presently disclosed systems and methods. In some embodiments, the host device may also include applications for generating notched audio output, such as notched music, which can then be streamed to the user's endpoint device.

The system 10 may also include one or more endpoint devices 18, 20 which may be utilized by the user to communicate with the instant software 14, either on the host device 12 or remote server 34. Endpoint devices 18, 20 may typically be a network-enabled wireless handheld device, such as a PDA or smart phone, which can run an application 22. However, the endpoint devices 18, 20 may also be any type of device capable of running application 22 and connecting to the host device 12, such as a laptop or desktop computer, a gaming console, a game controller, etc. In some embodiments, the endpoint devices 18, 20 may also be capable of generating and/or playing the notched audio output generated by the instant software.

In some embodiments, the host device 12 and/or endpoint devices 18, 20 can include a browser application that is configured to receive and to send web pages, and the like. In embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In some embodiments, the host device 12 and/or endpoint devices 18, 20 can be programmed in either Java or .Net.

The host device 12, remote server 34 and/or endpoint devices 18, 20 may be connected to a private or public network to enable them to receive and send a message over the network to and from one another or other computing devices. In some embodiments, the host device 12 can connect to the remote server via a public network 30 and to the endpoint devices via a private network 24. The network can typically be the Internet, a local area network (LAN), a wide area network (WAN) or other types of networks, including but not limited to, a Bluetooth® network, a USB network, direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another. Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, networks 24, 30 can include any communication method by which information may travel between computing devices. Connections 26, 28 may be wired or wireless connections and may employ any appropriate communication technologies and protocols to enable communication between the devices.

The system 10 may further include a network interface device 32. The interface device may provide a bridge between private network 24 and public network 30, and also may provide a security barrier between private network 24 and the internet, such as a firewall. Typical examples of network interface device 32 are cable modems, DSL modems, T1 connections, and the like. Devices connected to public network 30 (i.e. the internet) typically cannot penetrate the security barrier of network interface device 32 to discover or communicate with devices on private network 32. However, In some embodiments, network interface device 32 may allow devices on private network 24 to access public network 30 so that they can browse the internet, download applications, and communicate with devices on the internet. Network interface device 32 may be a single network interface device, or may be multiple network interface devices that provide multiple access points between private network 24 and the internet.

In some embodiments, the devices of the system 10 can utilize NFC technology to obtain/transmit information. In some embodiments, NFC can represent a short-range wireless communications technology in which NFC-enabled devices are "swiped," "bumped," "tapped" or otherwise moved in close proximity to communicate. In some embodiments, NFC could include a set of short-range wireless technologies, typically requiring a distance of 10 cm or less. In some embodiment, NFC can operates at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable device within close proximity of each other.

In some embodiments, NFC tags can contain data and be read-only or rewriteable. In some embodiments, NFC tags can be custom-encoded. In some embodiments, NFC tags and/or NFC-enabled device (e.g., smart phones with NFC capabilities) can securely store personal data such as debit and credit card information, loyalty program data, PINs and networking contacts, and/or other information. NFC tags can be encoded to pass a Uniform Resource Locator (URL) and a processor of the NFC-enabled device can automatically direct a browser application thereof to the URL without prompting for permission to proceed to the designated location.

In some embodiments, data may also be communicated using any wireless means of communication, such as 4G, 3G, GSM, GPRS, WiFi, WiMax, and other remote local or remote wireless communication using information obtained via the interfacing of a wireless NFC enabled mobile device to another NFC enabled device or a NFC tag. In some embodiments, the term "wireless communications" includes communications conducted at ISO 14443 and ISO 18092 interfaces. In some embodiments, the communications between NFC-enabled smart device and lottery provided equipment (e.g., terminals, POS, POE, Hosts) is performed, for example, in accordance with the ISO 14443A/B standard and/or the ISO 18092 standard.

System 10 shows a typical configuration for the methods described herein. However, system 10 is not the only architecture within which the inventions described herein can operate. One skilled in the art will recognize that various system architectures can support the systems, methods, and apparatuses described herein. Also, although not shown, any of the applications and processes may be run by any computing device within system 10, or by any computing device capable of running the applications and processes. For example, in some embodiments, the tinnitus software may be stored and executed on one of the end devices 18, 20, in addition to or instead of storing and executing the tinnitus software 14 on the host device 12.

Figure 16:
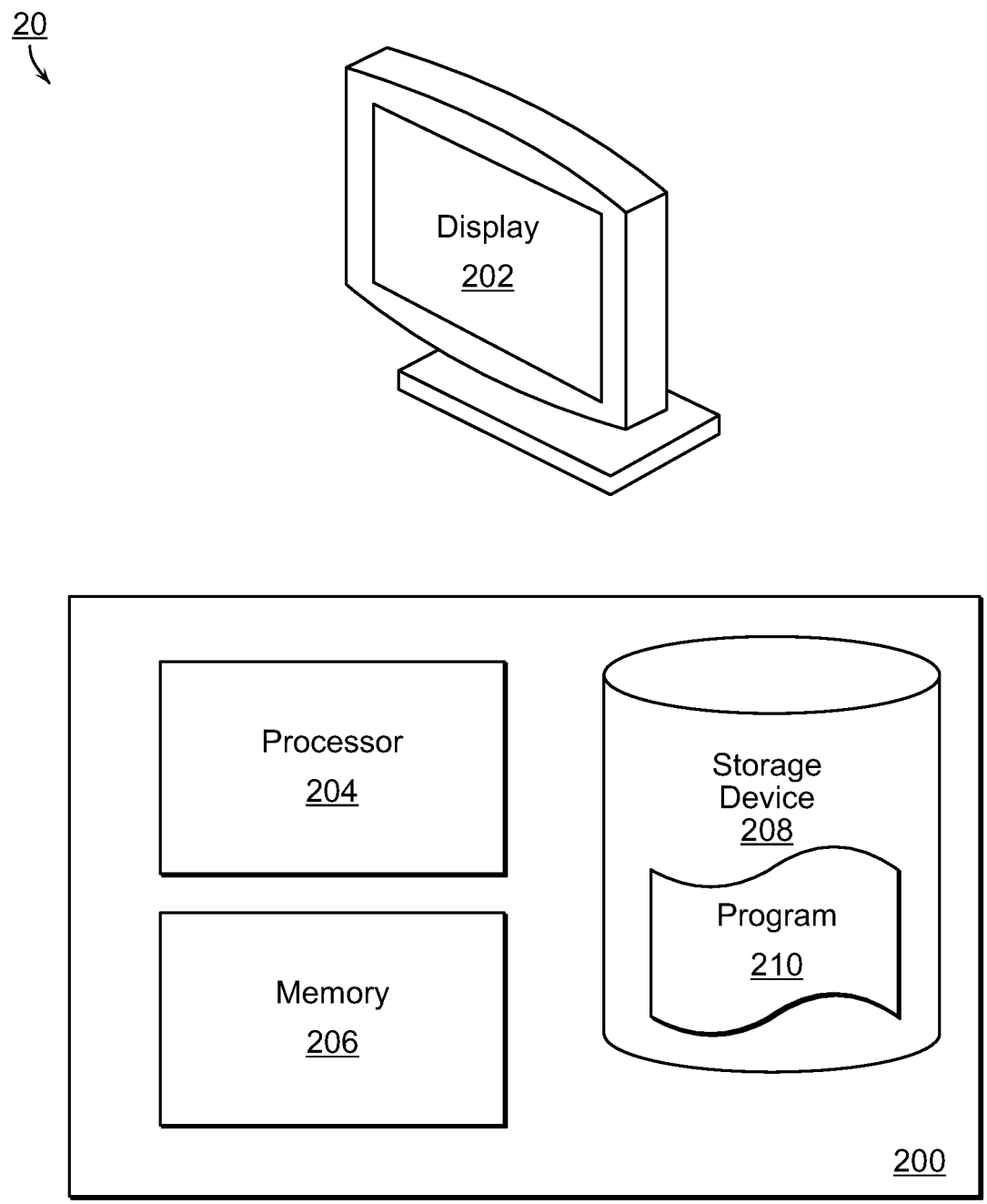
FIG. 16 shows a diagram of a typical processing architecture that may be utilized for the methods and systems of the present disclosure.

The methods of the present disclosure disclosed herein may be implemented as hardware, software, or a combination of hardware and software. FIG. 16 shows a diagram of a typical processing architecture, which may execute software applications and processes. The host 20, which may include a computer processing device 200, otherwise referred to in this application as a computing device or a part of a computing device, partly or fully operated according to the execution of software instructions, e.g., stored on a tangible machine readable medium, is coupled to display 202 for graphical output. Processor 204 may be a computer processor capable of executing software. Typical examples are computer processors (such as Intel® or AMD® processors), ASICs, microprocessors, and the like. Processor 204 may be coupled to memory 206, which may typically be a volatile RAM memory for storing instructions and data while processor 204 executes. Processor 204 may also be coupled to storage device 208, which is a non-volatile storage medium, such as a hard drive, FLASH drive, tape drive, DVDROM, or similar device. Although not shown, computer processing device 200 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 200. Processor 204 may also be coupled to other type of computer-readable media, including, but are not limited to, an electronic, optical, magnetic, or other storage or transmission device capable of providing a processor, such as the processor 204, with computer-readable instructions. Various other forms of computer-readable media can transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Program 210 may be a computer program or computer readable code containing instructions and/or data, and may be stored on storage device 208. The instructions may comprise code from any computer-programming language, including, for example, C, C++, C#, Visual Basic, Java, Python, Perl, and JavaScript. In a typical scenario, processor 204 may load some or all of the instructions and/or data of program 210 into memory 206 for execution. Program 210 can be any computer program or process including, but not limited to web browser 16, browser application 14, address registration process 36, application 22, or any other computer application or process. Program 210 may include various instructions and subroutines, which, when loaded into memory 206 and executed by processor 204 cause processor 204 to perform various operations, some or all of which may effectuate the methods disclosed herein. Program 204 may be stored on any type of non-transitory computer readable medium, such as, without limitation, hard drive, removable drive, CD, DVD or any other type of computer-readable media.

All patents, patent applications, and published references cited herein are hereby incorporated by reference in their entirety for all purposes and as if the entire disclosure, including claims, if any and Figures were repeated verbatim in the present application. While the methods of the present disclosure have been described in connection with the specific embodiments thereof, it will be understood that it is capable of further modification. Furthermore, this application is intended to cover any variations, uses, or adaptations of the methods of the present disclosure, including such departures from the present disclosure as come within known or customary practice in the art to which the methods of the present disclosure pertain, and as fall within the scope of the appended claims.

What is claimed is:

1. A computer-implemented method comprising:
   generating, by a computing device, a globally unique and random address, wherein the globally unique and random address is unique for all cells ever allocated with no correlation to information regarding a virtual dynamic object, and with no duplication for all cells ever allocated, wherein the globally unique and random address is generated before existence of the virtual dynamic object;
   allocating a memory cell with the globally unique and random address for the virtual dynamic object, the virtual dynamic object comprising code, data, or a combination of code and data;
   exposing, by the computing device, the globally unique and random address to a client device of a unique consumer;
   receiving, by the computing device, the globally unique and random address from the client device; and
   upon receipt of the globally unique and random address from the client device, matching and validating, by an address resolution module of the computing device, the globally unique and random address with the memory cell to facilitate access by the unique user to the virtual dynamic object.

2. The method of claim 1, wherein the virtual dynamic object facilitates access to one or more additional objects.

3. The method of claim 2, wherein the virtual dynamic object comprises a plurality of globally unique and random addresses, each matched in a respective address resolution module with a respective memory cell for facilitating access to one or more additional objects.

4. The method of claim 1, wherein the virtual dynamic object comprises at least one of a form, a file or a set of instructions, the set of instructions defining at least one of a service, a procedure or a function.

5. The method of claim 1 further comprising:
storing the memory cell in a storage device in a storage space location identified by the globally unique and random address defined independently of the physical location in the storage space of the storage device.

6. The method of claim 1, wherein the memory cell has associated access parameters.

7. The method of claim 6 further comprising:
providing, by a cell access provider of the computing device, the access parameters to the client device.

8. The method of claim 1, wherein the virtual dynamic object comprises an object having at least one of a property or a method not identified until runtime.

9. The method of claim 1 wherein the virtual dynamic object comprises an input information gathering mechanism forming at least a part of a work-flow process.

10. A computing device comprising:
a processor;
a storage medium for tangibly storing thereon program logic for execution by the processor, the stored program logic comprising:
address generating logic executed by the processor for generating a globally unique and random address, wherein the globally unique and random address is unique for all cells ever allocated with no correlation to information regarding a virtual dynamic object, and with no duplication for all cells ever allocated, and wherein the globally unique and random address is generated before existence of the virtual dynamic object;
memory cell allocating logic executed by the processor for allocating a memory cell with the globally unique and random address for the virtual dynamic object, the virtual dynamic object comprising code, data, or a combination of code and data;
address exposing logic executed by the processor for exposing the globally unique and random address to a client device of a unique consumer;
receiving logic executed by the processor for receiving the globally unique and random address from the client device; and
matching and validating logic executed by the processor for, upon receipt of the globally unique and random address from the client device, matching and validating the globally unique and random address with the memory cell to facilitate access by the unique user to the virtual dynamic object.

11. The computing device of claim 10 further comprising:
access facilitating logic executed by the processor for facilitating, via the virtual dynamic object, access to one or more additional objects.

12. The computing device of claim 11, wherein the virtual dynamic object comprises a plurality of globally unique and random addresses, each matched in a respective address resolution module with a respective memory cell for facilitating access to one or more additional objects.

13. The computing device of claim 10, wherein the virtual dynamic object comprises at least one of a form, a file, or a set of instructions, the set of instructions defining at least one of a service, a procedure, or a function.

14. The computing device of claim 10 further comprising:
storing logic executed by the processor for storing the memory cell in a storage device in a storage space location identified by the globally unique and random address defined independently of the physical location in the storage space of the storage device.

15. The computing device of claim 10, wherein the memory cell has associated access parameters.

16. The computing device of claim 15 further comprising:
providing logic executed by the processor for providing the access parameters to the client device by a cell access provider of the computing device.

17. The computing device of claim 10, wherein the virtual dynamic object comprises an object having at least one of a property or a method not identified until runtime.

18. The computing device of claim 10 wherein the virtual dynamic object comprises a non-uniform object which at least one of modifies itself or is modified during runtime according to at least one of a variable, a parameter or a function.

19. The computing device of claim 10 wherein the virtual dynamic object comprises an input information gathering mechanism forming at least a part of a work-flow process.

20. A non-transitory computer readable storage medium storing instructions which, when executed by a computing device, cause the computing device to perform a method, the method comprising:
generating, by the computing device, a globally unique and random address, wherein the globally unique and random address is unique for all cells ever allocated with no correlation to information regarding a virtual dynamic object, and with no duplication for all cells ever allocated, and wherein the globally unique and random address is generated before existence of the virtual dynamic object;
allocating, by the computing device, a memory cell with the globally unique and random address for the virtual dynamic object, the virtual dynamic object comprising code, data, or a combination of code and data;
exposing, by the computing device, the globally unique and random address to a client device of a unique consumer;
receiving, by the computing device, the globally unique and random address from the client device; and
upon receipt of the globally unique and random address from the client device, matching and validating, by an address resolution module of the computing device, the globally unique and random address with the memory cell to facilitate access by the unique user to the virtual dynamic object.

21. A computer-implemented method comprising
generating, by a computing device, a globally unique and random address, wherein the globally unique and random address is unique for all cells ever allocated with no correlation to information regarding a virtual dynamic object, and with no duplication for all cells ever allocated;
allocating a memory cell with the globally unique and random address for the virtual dynamic object, the virtual dynamic object comprising code, data, or a combination of code and data;
exposing, by the computing device, the globally unique and random address to a client device of a unique consumer;
receiving, by the computing device, the globally unique and random address from the client device upon receipt of the globally unique and random address from the client device, matching and validating, by an address resolution module of the computing device, the globally unique and random address with the memory cell to facilitate access by the unique user to the virtual dynamic object; and generating a second globally unique and random address, wherein the second globally unique and random address is unique for all cells ever allocated with no correlation to information regarding a revised virtual dynamic object, and with no duplication for all cells ever allocated.

22. A computer-implemented method comprising generating, by a computing device, a globally unique and random address, wherein the globally unique and random address is unique for all cells ever allocated with no correlation to information regarding a virtual dynamic object, and with no duplication for all cells ever allocated;

allocating a memory cell with the globally unique and random address for the virtual dynamic object, the virtual dynamic object comprising code, data, or a combination of code and data;

exposing, by the computing device, the globally unique and random address to a client device of a unique consumer;

receiving, by the computing device, the globally unique and random address from the client device upon receipt of the globally unique and random address from the client device, matching and validating, by an address resolution module of the computing device, the globally unique and random address with the memory cell to facilitate access by the unique user to the virtual dynamic object; and allocating a second memory cell with a second globally unique and random address for a revised virtual dynamic object, the revised virtual dynamic object comprising a revised version of the virtual dynamic object.

23. A computing device comprising:

a processor;

a storage medium for tangibly storing thereon program logic for execution by the processor, the stored program logic comprising:

address generating logic executed by the processor for generating a globally unique and random address, wherein the globally unique and random address is unique for all cells ever allocated with no correlation to information regarding a virtual dynamic object, and with no duplication for all cells ever allocated and for generating a second globally unique and random address, wherein the second globally unique and random address is unique for all cells ever allocated with no correlation to information regarding a revised virtual dynamic object, and with no duplication for all cells ever allocated;

memory cell allocating logic executed by the processor for allocating a memory cell with the globally unique and random address for the virtual dynamic object, the virtual dynamic object comprising code, data, or a combination of code and data;

address exposing logic executed by the processor for exposing the globally unique and random address to a client device of a unique consumer;

receiving logic executed by the processor for receiving the globally unique and random address from the client device; and matching and validating logic executed by the processor for, upon receipt of the globally unique and random address from the client device, matching and validating the globally unique and random address with the memory cell to facilitate access by the unique user to the virtual dynamic object.

24. A computing device comprising:

a processor;

a storage medium for tangibly storing thereon program logic for execution by the processor, the stored program logic comprising:

address generating logic executed by the processor for generating a globally unique and random address, wherein the globally unique and random address is unique for all cells ever allocated with no correlation to information regarding a virtual dynamic object, and with no duplication for all cells ever allocated;

memory cell allocating logic executed by the processor for allocating a memory cell with the globally unique and random address for the virtual dynamic object, the virtual dynamic object comprising code, data, or a combination of code and data and for allocating a second memory cell with a second globally unique and random address for a revised virtual dynamic object, the revised virtual dynamic object comprising a revised version of the virtual dynamic object;

address exposing logic executed by the processor for exposing the globally unique and random address to a client device of a unique consumer;

receiving logic executed by the processor for receiving the globally unique and random address from the client device; and matching and validating logic executed by the processor for, upon receipt of the globally unique and random address from the client device, matching and validating the globally unique and random address with the memory cell to facilitate access by the unique user to the virtual dynamic object.

25. A non-transitory computer readable storage medium storing instructions which, when executed by a computing device, cause the computing device to perform a method, the method comprising:

generating, by the computing device, a globally unique and random address, wherein the globally unique and random address is unique for all cells ever allocated with no correlation to information regarding a virtual dynamic object, and with no duplication for all cells ever allocated;

allocating, by the computing device, a memory cell with the globally unique and random address for the virtual dynamic object, the virtual dynamic object comprising code, data, or a combination of code and data;

exposing, by the computing device, the globally unique and random address to a client device of a unique consumer;

receiving, by the computing device, the globally unique and random address from the client device;

upon receipt of the globally unique and random address from the client device, matching and validating, by an address resolution module of the computing device, the globally unique and random address with the memory cell to facilitate access by the unique user to the virtual dynamic object; and generating a second globally unique and random address, wherein the second globally unique and random address is unique for all cells ever allocated with no correlation to information regarding a revised virtual dynamic object, and with no duplication for all cells ever allocated.

26. A non-transitory computer readable storage medium storing instructions which, when executed by a computing device, cause the computing device to perform a method, the method comprising:

generating, by the computing device, a globally unique and random address, wherein the globally unique and random address is unique for all cells ever allocated with no correlation to information regarding a virtual dynamic object, and with no duplication for all cells ever allocated;

allocating, by the computing device, a memory cell with the globally unique and random address for the virtual dynamic object, the virtual dynamic object comprising code, data, or a combination of code and data;

exposing, by the computing device, the globally unique and random address to a client device of a unique consumer;

receiving, by the computing device, the globally unique and random address from the client device;

upon receipt of the globally unique and random address from the client device, matching and validating, by an address resolution module of the computing device, the globally unique and random address with the memory cell to facilitate access by the unique user to the virtual dynamic object; and allocating a second memory cell with a second globally unique and random address for a revised virtual dynamic object, the revised virtual dynamic object comprising a revised version of the virtual dynamic object.

* * * * *